(12) United States Patent
Tokumo

(10) Patent No.: US 9,388,898 B2
(45) Date of Patent: Jul. 12, 2016

(54) SHIFT DEVICE FOR VEHICLE

(71) Applicant: MAZDA MOTOR CORPORATION, Hiroshima (JP)

(72) Inventor: Masayuki Tokumo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/461,190

(22) Filed: Aug. 15, 2014

(65) Prior Publication Data
US 2015/0068343 A1    Mar. 12, 2015

(30) Foreign Application Priority Data

Sep. 10, 2013    (JP) ................. 2013-186861

(51) Int. Cl.
*F16H 61/02* (2006.01)
*F16H 59/10* (2006.01)
*F16H 59/02* (2006.01)
*F16H 61/24* (2006.01)

(52) U.S. Cl.
CPC .......... *F16H 61/0213* (2013.01); *F16H 59/105* (2013.01); *F16H 2059/0269* (2013.01); *F16H 2059/0273* (2013.01); *F16H 2061/245* (2013.01); *Y10T 74/2003* (2015.01)

(58) Field of Classification Search
CPC ..... F16H 61/0213; F16H 59/08; F16H 59/10; F16H 59/105; F16H 61/24; F16H 61/0204; F16H 2061/241; F16H 2061/245; F16H 2061/247; F16H 2059/026; F16H 2059/0269; F16H 2059/0239; F16H 2059/0273
USPC ............... 74/473.12, 473.18, 473.21, 473.25, 74/473.26, 473.27, 473.28, 473.3, 473.32, 74/473.33, 473.35
See application file for complete search history.

(56) References Cited

U.S. PATENT DOCUMENTS

| | | | | | |
|---|---|---|---|---|---|
| 5,176,041 | A | * | 1/1993 | Meier | G05G 5/03 338/128 |
| 5,410,931 | A | * | 5/1995 | Pecceu | F16H 59/044 74/335 |
| 5,680,797 | A | * | 10/1997 | Elsasser | G05G 5/06 74/471 R |
| 6,082,212 | A | * | 7/2000 | Bergman | G05G 9/047 74/471 XY |
| 6,448,670 | B1 | * | 9/2002 | Onodera | G05G 9/047 307/10.1 |
| 6,923,083 | B2 | * | 8/2005 | Fujinuma | F16H 59/0204 74/473.23 |
| 6,948,582 | B2 | * | 9/2005 | Shiomi | F16H 59/105 180/315 |
| 7,100,467 | B2 | * | 9/2006 | Shiomi | F16H 59/105 74/335 |
| 7,117,970 | B2 | * | 10/2006 | Shiomi | F16H 59/105 180/315 |
| 7,137,475 | B2 | * | 11/2006 | Shiomi | F16H 59/105 180/315 |

(Continued)

*Primary Examiner* — David M Fenstermacher
*Assistant Examiner* — Leonard J Archuleta
(74) *Attorney, Agent, or Firm* — Studebaker & Brackett PC

(57) ABSTRACT

In a shift device of the present invention, a shift range is switched to a drive range or a reverse range when a switch portion is operated additionally to moving of an operational member. Switching to a drive range is executed when the switch portion is operated further in a state in which the mount of move of the operational member tilted in a first direction from a home position exceeds a first threshold, and switching to a reverse range is executed when the switch portion is operated further in a state in which the mount of move of the operational member tilted in a second direction from the home position exceeds a second threshold which is greater than the first threshold. Accordingly, quick and easy selection of a traveling range can be conducted, ensuring the safety.

8 Claims, 20 Drawing Sheets

(56) References Cited

U.S. PATENT DOCUMENTS

| | | | | |
|---|---|---|---|---|
| 7,784,375 B2 * | 8/2010 | Bleckmann | ............ | F16H 61/22 74/473.18 |
| 8,301,348 B2 * | 10/2012 | Nagashima | ............ | F16H 61/18 701/58 |
| 9,254,745 B2 * | 2/2016 | Tokumo | ................ | B60K 20/02 |
| 9,303,756 B2 * | 4/2016 | Yamamoto | ........... | F16H 59/105 |
| 9,334,952 B2 * | 5/2016 | Tokumo | ............. | F16H 61/0213 |
| 2004/0025613 A1 | 2/2004 | Meyer et al. | | |
| 2006/0288812 A1 * | 12/2006 | Okawa | ................... | F16H 63/42 74/335 |
| 2008/0264193 A1 * | 10/2008 | Dorn | ..................... | F16H 59/105 74/473.3 |
| 2012/0291579 A1 | 11/2012 | Kamoshida | | |
| 2013/0327173 A1 * | 12/2013 | Iwata | .................... | F16H 59/105 74/473.12 |
| 2014/0345412 A1 * | 11/2014 | Wang | .................... | F16H 59/105 74/473.21 |
| 2016/0123460 A1 * | 5/2016 | Tsukazaki | ............ | F16H 59/105 74/473.23 |

* cited by examiner

Home Position

Forward Shifting

Rearward Shifting

| Current Range | P | | | | R | | | | N | | | | D | | | |
|---|---|---|---|---|---|---|---|---|---|---|---|---|---|---|---|---|
| Operation | Shift Lever | Forward | | Rearward | | Forward | | Rearward | | Forward | | Rearward | | Forward | | Rearward | |
| | Push Button | | Push | | Push | | Push | | Push | | Push | | Push | | Push | | Push |
| Range after Operation | | N | R | N | D | UN(R) | UN(R) | N | D | N | R | N | D | N | R | UN(D) | UN(D) |

FIG. 10

Corresponding to Second Threshold

Corresponding to First Threshold

Home Position

Forward Shifting

Rearward Shifting

Home Position

Left Shifting

Right Shifting

SHIFT DEVICE FOR VEHICLE

BACKGROUND OF THE INVENTION

The present invention relates to a shift device for a vehicle which switches shift ranges of the vehicle.

In recent years, a so-called electric shifter device which electrically detects a position of a shift lever and conducts gear shifting is known as a shift device for a vehicle. The electric shifter device has been widely used for electric vehicles or hybrid vehicles which do not have a mechanical type of transmission. However, the electric shifter device which has not require mechanical connection of the shift lever and the transmission has been also used gradually for vehicles equipped with the mechanical type of transmission, such as conventional vehicles equipped with an engine (internal combustion engine) only as a drive source, because of its superior flexibility of designing.

Further, the electric shifter device which is not restricted by an operational stroke of the shift lever is generally comprised of a so-called momentary type of mechanism in order to improve its compactness and operability. Specifically, the momentary type of electric shifter device is configured such that when the shift lever standing upright is operatically tilted in a specified direction from a home position, a shift range is changed, and then when the shift lever is released from its holding by a driver's hand, the shift lever is automatically returned to the home position, maintaining the changed shift range. Examples of this momentary type of electric shifter device are disclosed in U.S. Patent Application Publication Nos. 2004/0025613 A1 and 2012/0291579 A1.

While it has merits of the compactness and the like as described above, the above-described momentary type of electric shifter device has a demerit that the shift range may be improperly changed (a possible erroneous operation) when a driver or another passenger touches the shift lever inadvertently. In order to solve this demerit, the device disclosed in the former of the above-described patent publications is configured such that the shift range is switched to a neutral range when the shift lever is operated in a first direction from the home position, and the shift range is switched to a traveling range (a drive range or a reverse range) when the shift lever is operated in another direction (a second direction) from a current lever position (a neutral position). According to this device, even if the shift lever is tiled improperly through inadvertent touching of a hand of the driver or the like therewith, transmission of a drive force of an engine is shut off in accordance with changing to the neutral range only, and the traveling range is not selected unless the shift lever is operated in the second direction from the neutral position. Thus, any improper influence caused by the erroneous operation can be minimized.

An electric shifter device having a button switch at the shift lever is disclosed in the latter of the above-described patent publications. This electric shifter device is configured such that the neutral range is selected when the button switch is pressed, and the traveling range is selected when the shift lever is operated, keeping the button switch being pressed. According to this device, the traveling range is not selected unless the pressing operation of the button switch and the tilting operation of the shift lever are conducted concurrently. Thus, a situation in which the traveling range may be selected improperly against a driver's intent can be prevented.

When the traveling range is selected in the device of the former of the above-described patent publications, it is necessary that the shift lever is further tilted in the second direction after the shift lever has been tilted in the first direction, which makes a total stroke necessary for selecting the traveling range improperly long. This may cause the driver who wants quick selection of the traveling range to have troublesome feelings.

Meanwhile, the traveling range cannot be selected without pressing the button switch in the device of the latter of the above-described patent publications. This may be preferable for prevention of the erroneous operation of the shift lever (for improvement of the safety), but may be troublesome for the driver wanting the quick selection of the traveling range, too. That is, it is necessary in the device of the latter that the shift lever is tilted, keeping the button switch being pressed (i.e., gripping the shift lever firmly). This may lose the light and easy lever-operation, thereby making the driver have troublesome feelings, too.

SUMMARY OF THE INVENTION

The present invention has been devised in view of the above-described matters, and an object of the present invention is to provide a shift device for a vehicle which can select the traveling range quickly and easily, ensuring the safety.

According to the present invention, there is provided a shift device for a vehicle, comprising an operational member, a switch portion provided at the operational member, a body portion supporting the operational member such that the operational member is moved at least in two directions of a first direction and a second direction and automatically returned to a specified home position after the operational member has been moved, and a controller detecting operations of the operational member and the switch portion and controlling a shift range based on information of the detected operations, wherein the controller is configured such that a neutral range is selected when the operational member is operationally moved in any direction of the first and second directions from the home position in a state in which a non-travelling range is selected as the shift range, and the shift range is switched to a drive range for forward traveling or a reverse range for backward traveling when the switch portion is operated in addition to the operation of the operational member, the switching to the drive range is executed when the switch portion is operated in a state in which the amount of move of the operational member operationally moved in the first direction from the home position exceeds a first threshold, and the switching to the reverse range is executed when the switch portion is operated in a state in which the amount of move of the operational member operationally moved in the second direction from the home position exceeds a second threshold which is greater than the first threshold.

According to the present invention, even when the operational member is shifted in the first direction or the second direction from the home position in a state in which the non-traveling range is selected, the shift range is merely switched to the neutral range, not switched to the traveling range (the drive range or the reverse range) unless the switch portion is pressed further in this state. Therefore, even if there is an erroneous operation, such an inadvertent touching of a hand of the driver or the like with the operational member, any improper situation in which the vehicle starts improperly against the driver's intent can be avoided, so that the safety of the vehicle can be ensured properly.

Further, when it is wanted to switch the shift rage to the traveling range (the drive range or the reverse range), this switching can be achieved simply by operationally moving the operational member first and then operating the switch portion further. Therefore, the driver may not be burdened so much in an initial stage of the operation and can conduct the switching operation to the traveling range quickly and easily accordingly. That is, differently from a case where a shift pattern in which the switch portion is operated before the operational member's operation is applied, there is no need to operate the operational member, keeping the switch portion being operated. Therefore, the driver may not need to grip the operational member firmly and can move the operational member through a relatively light and easy action. And, since the traveling range can be selected by operating the operational member and then operating the switch portion, the superior operability can be obtained, ensuring the safety.

Further, according to the present invention, when the operational member is operationally moved in the first direction for switching to the drive range, the operation of the switch portion is accepted so as to switch to the drive range on condition that the amount of move from the home position of the operational member exceeds the first threshold. Meanwhile, when the operational member is operationally moved in the second direction for switching to the reverse range, the operation of the switch portion is not accepted unless the amount of move from the home position of the operational member exceeds the second threshold greater than the first threshold. If the amount of move of the operational member which is necessary for switching to the reverse range (the second threshold) is set to be greater than the amount of move of the operational member which is necessary for switching to the drive range (the first threshold) as described above, the driver is required to operate the operational member more greatly at the time of switching to the reverse range to move the vehicle backward. Thereby, the driver who tries to move the vehicle backward can be urged to operate carefully, so that the safety can be improved.

Herein, it may be preferable that the first and second directions be arranged on the same straight line (which extends in a vehicle longitudinal direction) but extend in opposite directions to each other. This arrangement is more appropriate in providing the driver with an easily-understandable operation.

According to an embodiment of the present invention, the shift device for a vehicle further comprising an informing device to provide specified information to a driver of the vehicle, respectively, when the amount of move of the operational member operationally moved in the first direction from the home position for the switching to the drive range exceeds the first threshold and when the amount of move of the operational member operationally moved in the second direction from the home position for the switching to the reverse range exceeds the second threshold. Thereby, the driver can recognize, based on the information provided by the informing device which is operated when the amount of move of the operational member exceeds the first threshold or the second threshold, that the operation of the switch portion is acceptable, that is—that the shift range is switchable to drive range or the reverse range through an additional operation of the switch portion. Accordingly, the timing of the operation of the switch portion to be conducted becomes easily understandable, so that the operability of the shift device can be further improved.

According to another embodiment of the present invention, the body portion comprises a first resistance-applying member to temporarily increase a resistant force for the operational member right before the amount of move of the operational member operationally moved in the first direction has exceeded the first threshold, and a second resistance-applying member to temporarily increase another resistant force for the operational member right before the amount of move of the operational member operationally moved in the second direction has exceeded the second threshold. In a case in which the resistant force for the operational member is increased temporarily right before the amount of move of the operational member has exceeded the first threshold or the second threshold, the driver can recognize, based on clicking feelings caused by a change of the resistant force, that the operation of the switch portion is acceptable. Accordingly, the timing of the operation of the switch portion to be conducted becomes easily understandable, so that the operability of the shift device can be further improved.

Other features, aspects, and advantages of the present invention will become apparent from the following description which refers to the accompanying drawings.

BRIEF DESCRIPTION OF THE DRAWINGS

FIG. 7A showing a state in which the shift lever is located at a home position; FIG. 7B showing a state in which the shift lever is tilted forward; and FIG. 7C showing a state in which the shift lever is tilted rearward.

FIG. 9A showing the shift pattern from a parking range; FIG. 9B showing the shift pattern from a reverse range; FIG. 9C showing the shift pattern from a neutral range; and FIG. 9D showing the shift pattern from a drive range.

FIG. 10 is a chart of the shift patterns shown in FIGS. 9A-9D.

FIG. 18A showing a state in which the shift lever is located at a home position; FIG. 18B showing a state in which the shift lever is tilted forward; and FIG. 18C showing a state in which the shift lever is tilted rearward.

FIG. 19A showing a state in which the shift lever is located at the home position; FIG. 19B showing a state in which the shift lever is tilted to the left; and FIG. 19C showing a state in which the shift lever is tilted right.

FIG. 21A showing the shift pattern from the parking range; FIG. 21B showing the shift pattern from the reverse range; FIG. 21C showing the shift pattern from the neutral range; FIG. 21D showing the shift pattern from the drive range; and FIG. 21E showing the shift pattern from a manual range.

DETAILED DESCRIPTION OF THE INVENTION

Hereinafter, preferred embodiments of the present invention will be described referring to the accompanying drawings.

Embodiment 1

(1) Whole Constitution

Figure 1:
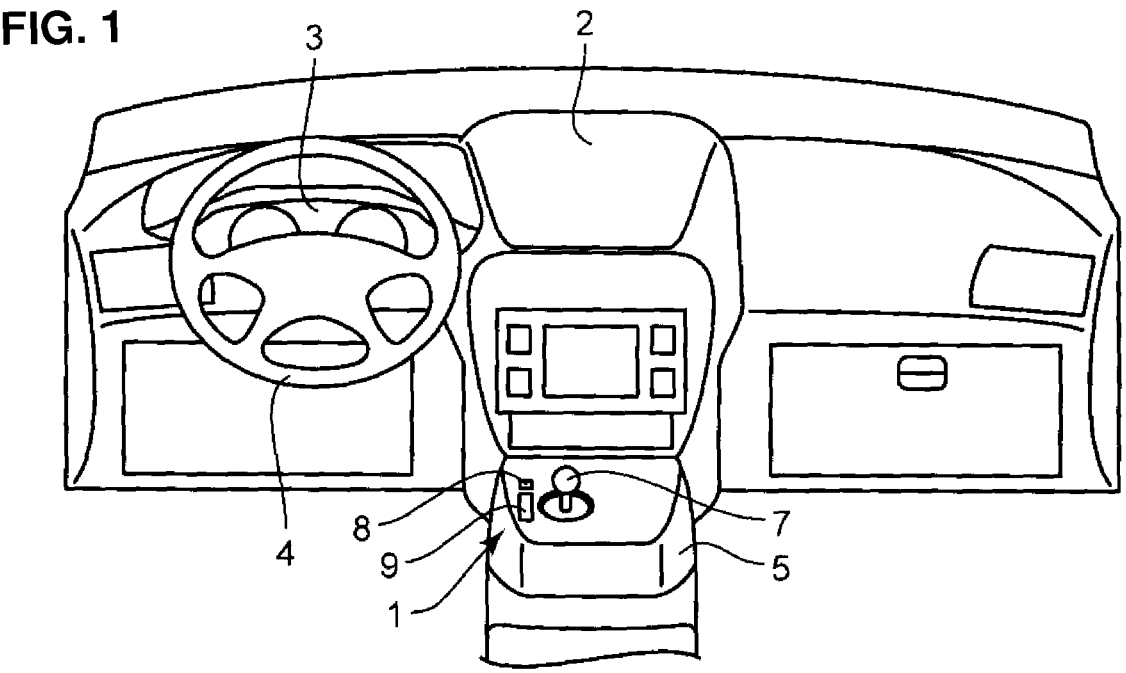
FIG. 1 is a diagram showing constitution of a vehicle-compartment front portion of a vehicle to which a shift device according to a first embodiment of the present invention is applied.

FIG. 1 is a diagram showing constitution of a vehicle-compartment front portion of a vehicle to which a shift device according to a first embodiment of the present invention is applied. As shown in this figure, an instrument panel 2 which extends in a vehicle width direction is provided at the vehicle-compartment front portion. A meter unit 3 is provided on a driver's-seat side of the instrument panel 2 (on the left side in FIG. 1), and a steering handle 4 is provided in back of the meter unit 3. A center console 5 is provided to extend toward a vehicle rear side from a central portion, in the vehicle width direction, of the instrument panel 2, and a shift device 1 is provided on the center console 5.

In the first embodiment, the vehicle comprises an engine (not illustrated) which is comprised of an internal combustion engine, such as a gasoline engine or a diesel engine, and a multi-stage type of automatic transmission 50 (FIG. 8) which transmits a drive force of the engine to wheels with speed reductions. The automatic transmission 50 is a transmission (AT) which automatically selects a speed-reduction ratio in accordance with a vehicle speed, an engine load, and others. The automatic transmission 50 has shift ranges of a neutral range in which the drive force's transmission is shut off, a parking range in which an output shaft is locked additionally to the shutting-off of the drive force's transmission, a drive range (forward-traveling range) in which the drive force is transmitted so as to make the vehicle travel (move) forward, and a reverse range (backward-traveling range) in which the drive force is transmitted so as to make the vehicle travel (move) backward. The shift device 1 is operated to select a desired range among the plural shift ranges of the automatic transmission.

Figure 2:
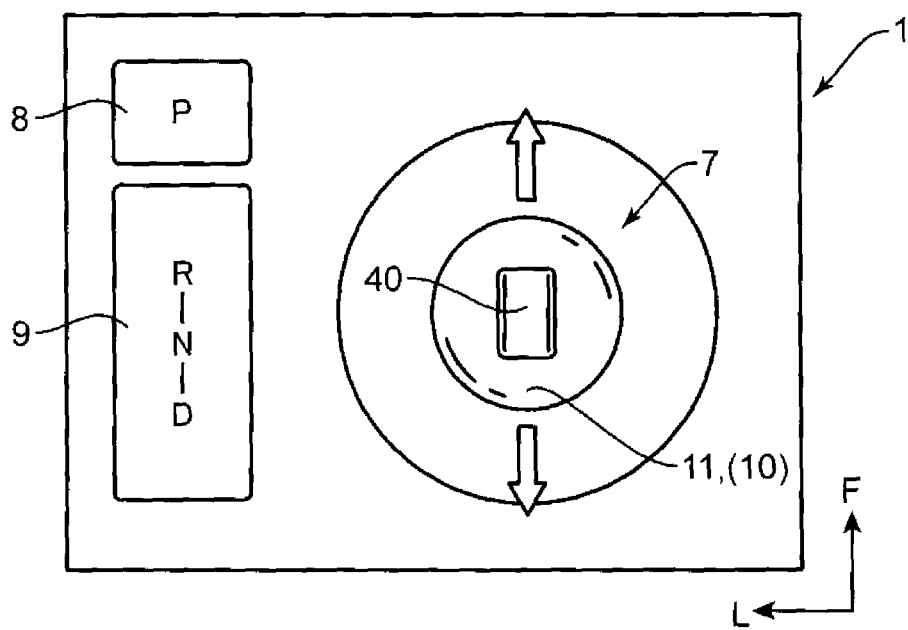
FIG. 2 is a plan view of the shift device.

FIG. 2 is an enlarged plan view of the shift device 1. As shown in FIG. 2 as well as FIG. 1, the shift device 1 comprises a main operational portion 7, a parking switch 8, and an indicator 9. In FIG. 2, an arrow F shows a forward direction of the vehicle and an arrow L shows a left direction of the vehicle, which are the same in the other figures.

The parking switch 8 is a push type of button switch which is operated to switch the shift range of the automatic transmission 50 to the parking range. A letter plate with a letter of "P" is provided at an upper face of the parking switch 8. The letter of "P" is configured to be highlighted with light indication generated by a light source, such as LED, when the parking range is selected. That is, the parking switch 8 functions as a switch means for switching to the parking range and also as an indicator means for indicating that the parking range is selected now.

The main operational portion 7 is operated when the shift range of the automatic transmission 50 is switched to other ranges than the parking range (i.e., to the drive range, the reverse range or the neutral range). The main operational portion 7 of the first embodiment is configured to be operated in some manners including longitudinally tilting, which will be described specifically later. The shift range of the automatic transmission 50 is switchable to any of the drive range, the reverse range, and the neutral range, depending on the operational patterns for the main operational portion 7.

The indicator 9 indicates the shift range which is selected at the moment. In the indicator 9 shown in FIG. 2, letter plates of the reverse range: "R", the neutral range: "N" and the drive range: "D" are arranged in order from the front. When any of the drive range, the reverse range, and the neutral range is selected in accordance with the operation of the main operational portion 7, one of the letters which corresponds to the selected range (R, N or D) is highlighted with the light indication.

Further, the shift range is also indicated at the meter unit 3 in the first embodiment, additionally to the indicating of the shift range at the indicator 9. That is, the meter unit 3 has an indication portion which is comprised of a liquid-crystal screen or the like at a specified position thereof (between a vehicle-speed meter and an engine-speed meter, for example). The letter (P, R, N, D) corresponding to the selected shift range is indicated at the indication portion.

Next, a specific structure of the main operational portion 7 of the shift device 1 will be described referring to FIGS. 2-7. As shown in the figures, the main operational portion 7 comprises a shift lever 10 and a body portion 20 which supports the shift lever 10 such that that the shift lever 10 is moved (tilted) longitudinally.

The shift lever 10, which corresponds to the "operational member" in the claims, comprises a shift knob 11 to be gripped by the driver, a bar-shaped lever portion 12 which extends downward from the shift knob 11, a sphere portion 13 which is provided at a lower end of the lever portion 12, and a leg portion for detent 14 and a leg portion for guide 15 which project obliquely downward from the sphere portion 13, respectively.

A push button 40 is provided at the shift knob 11. The push button 40, which corresponds to the "switch portion" in the claims, is a push type of button switch including an electric contact (not illustrated) which generates a specified signal when being pressed. The driver who operates the shift lever 10 can operationally press the push button 40 by using a thumb or another finger of a hand of the driver, griping the shift knob 11.

The leg portion for detent 14 comprises a hollow-shaped leg body 14b which extends obliquely downward from a lower face of the sphere portion 13 and a biasing portion 14a which projects downward from a tip of the leg body 14b. The biasing portion 14a is pressed downward by a compressive spring (not illustrated) provided inside of the leg body 14b. The biasing portion 14a is supported at the leg body 14b so as to advance and retreat relative to the leg body 14b in such a manner that it goes up when receiving an upward force which pushes back the compressive spring and it goes down when the upward force decreases.

The leg portion for guide 15 is a bar-shaped member which extends obliquely downward from the lower face of the sphere portion 13. In the first embodiment, the leg portion for detent 14 slants left and the leg portion for guide 15 slants right.

The body portion 20 comprises a boxy housing 21 which has an opening its upper face and a cover portion 22 which covers the opening of the upper face of the housing 21.

The cover portion 22 has a circular through hole 22a, into which the lever portion 12 of the shift lever 10 is inserted. An inner diameter of the through hole 22a is set to be greater than an outer diameter of the lever portion 12 by a specified value.

A lever support portion 23 which supports the sphere portion 13 of the shift lever 10 in a wrapping manner is attached inside the housing 21 through a pair of left-and-right connection portions 24. The lever support portion 23 is a hollow member which has openings at its upper and lower faces, and has an inner peripheral face which is formed in a partial sphere shape along an outer peripheral face of the sphere portion 13. The sphere portion 13 supported at the lever support portion 23 is configured to rotate freely inside the lever support portion 23.

The housing 21 has a first slant face portion 21a and a second slant face portion 21b which slant in a V shape at its lower wall portion. The first slant face portion 21a is formed along a face substantially-perpendicularly to an axial center of the leg portion for detent 14, facing the leg portion for detent 14 of the shift lever 10. The second slant face portion 21b is formed along a face substantially-perpendicularly to an axial center of the leg portion for guide 15, facing the leg portion for guide 15 of the shift lever 10.

A guide member 25 with a sphere-shaped receipt face 25a which is concaved in a partial sphere shape is provided at an upper face of the first slant face portion 21a. A tip end portion of the leg portion for detent 14 of the shift lever 10, i.e., the biasing portion 14a is pressed against the sphere-shaped receipt face 25a with a pressing force of the compressive spring all the time.

The biasing portion 14a is configured to advance the most from the leg body 14b when contacting a central portion (a button portion of the concaved face) of the sphere-shaped receipt face 25a, and to retreat against the pressing force of the compressive spring as its contact position goes away from the central portion of the sphere-shaped receipt face 25a. The biasing portion 14a which has retreated is strongly pressed against the sphere-shaped receipt face 25a by the compressive spring, and this pressing force is transferred to a force for returning the biasing portion 14a to the central portion of the sphere-shaped receipt face 25a. Accordingly, in a state in which an operational force by the driver's hand (a force for tilting the shift lever 10) is not applied to the shift lever 10, the shift lever 10 is held at a state in which the biasing portion 14a is positioned at the central portion of the sphere-shaped receipt face 25a. Thus, the shift lever 10 takes its position where it stands upright when the biasing portion 14a is positioned at the central portion of the sphere-shaped receipt face 25a. Hereinafter, this position of the shift lever 10 will be referred to as "home position."

Meanwhile, as the shift lever 10 located at the home position is tilted in a specified direction when receiving the operational force, the biasing portion 14a goes away from the central portion of the sphere-shaped receipt face 25a, and also the force for returning the biasing portion 14a to the central portion of the sphere-shaped receipt face 25a occurs accordingly. Therefore, when the operational force for the shift lever 10 is released, the shift lever 10 is automatically returned to the above-described home position.

As described above, in the first embodiment, a detent mechanism 30 to automatically return the tilted shift lever 10 to the home position is constituted by the sphere-shaped receipt face 25a which is concaved in the partial sphere shape and the biasing portion 14a which is biased to the sphere-shaped receipt face 25a all the time. In other words, the shift device 1 of the first embodiment which is equipped with the above-described detent mechanism 30 belongs to the so-called momentary type of shift device.

Figure 5:
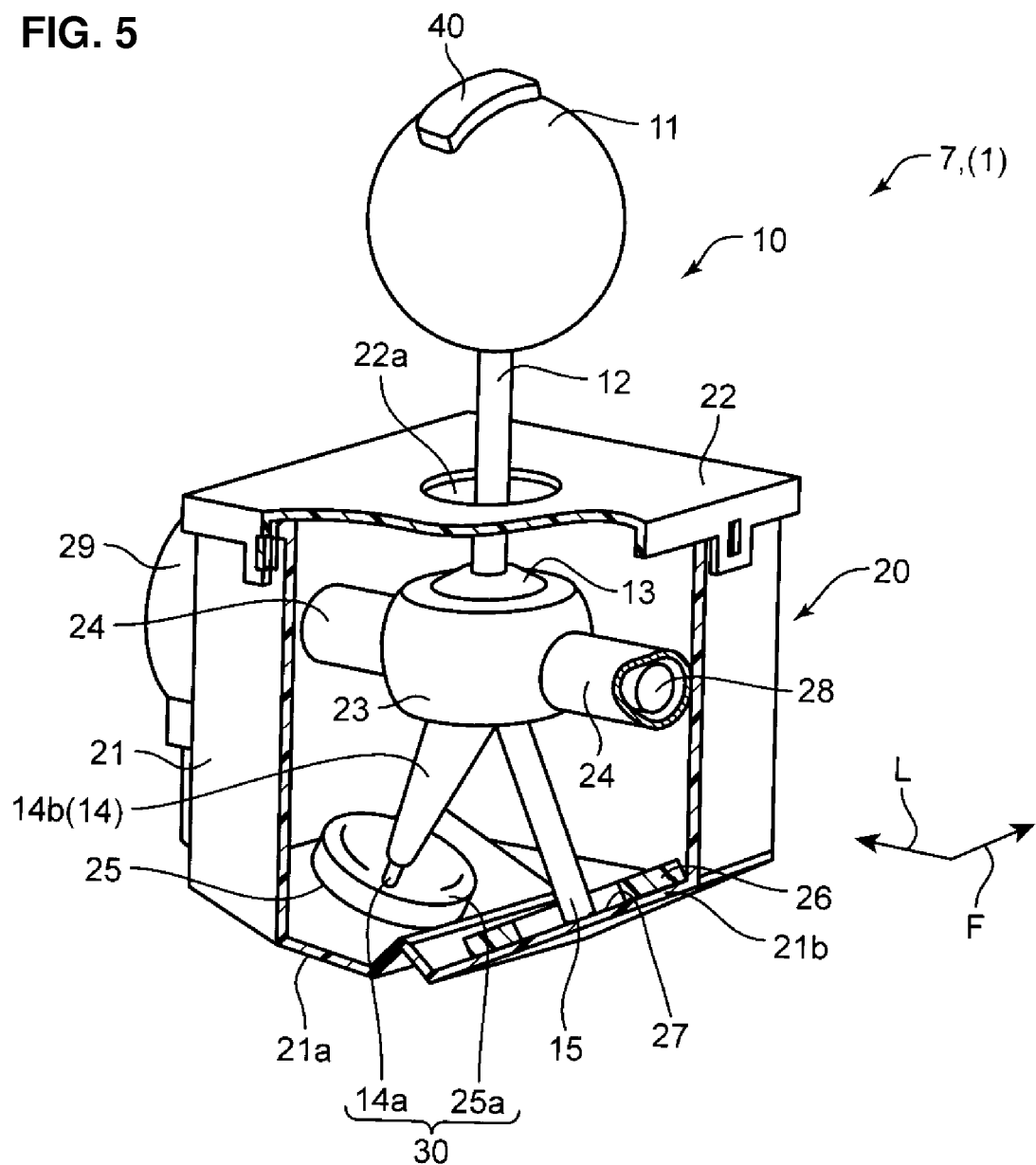
FIG. 5 is a perspective view of the shift device, a part of which is cut off.
Figure 6:
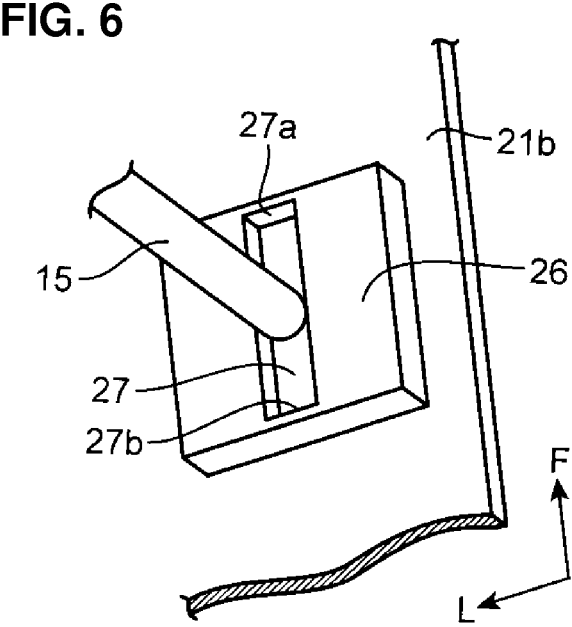
FIG. 6 is a diagram explaining a guide mechanism of a shift lever which is used at the shift device.

As shown in FIGS. 5 and 6, a guide member 26 which has a guide groove 27 extending longitudinally is provided at an upper face of the second slant face portion 21b. The tip end portion of the leg portion for guide 15 of the shift lever 10 engages with the guide groove 27 so as to slide along the guide groove 27. The shift lever 10 is supported at the above-described lever support portion 23 in a state in which the leg portion for guide 15 engages with the guide groove 27 as described above, so that the shift lever 10 can be tilted only longitudinally along the guide groove 27.

Figure 7A:
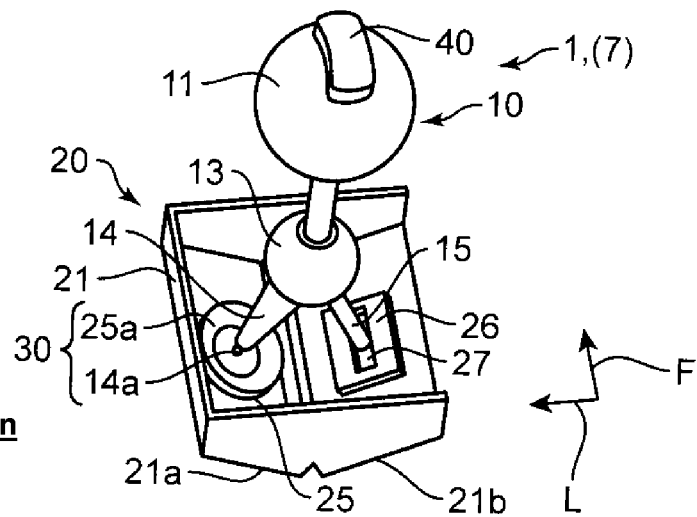
FIGS. 7A-7C are diagrams explaining moves of the shift lever.

FIG. 7A shows a state in which the shift lever 10 is located at the home position. When the shift lever 10 is located at the home position, that is—when the biasing portion 14a is positioned at the central portion of the sphere-shaped receipt face 25a and the shift lever 10 stands upright accordingly, the tip end portion of the leg portion for guide 15 is located at a longitudinal center of the guide groove 27.

Figure 7B:
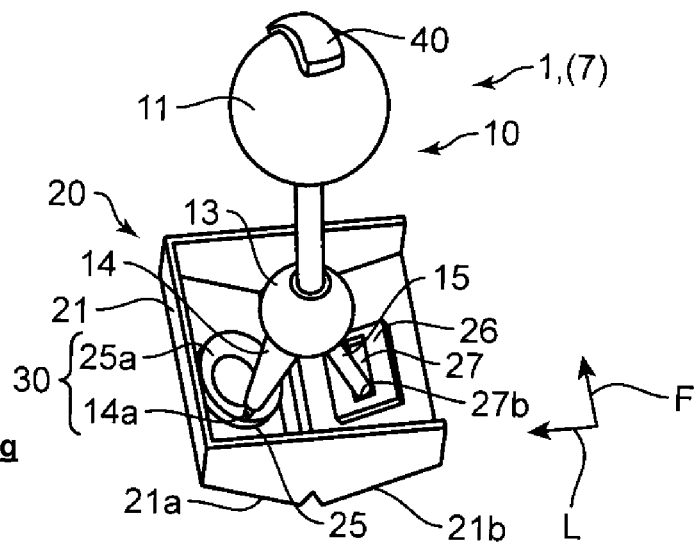
Figure 7C:
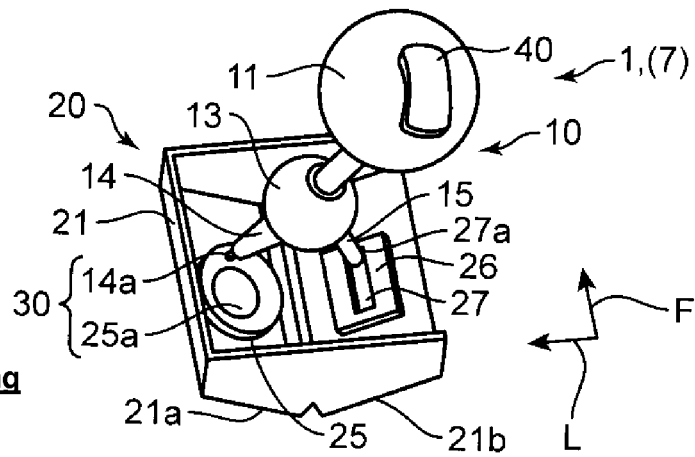

As the shift lever 10 is tilted forward from this state as shown in FIG. 7B, the tip end portion of the leg portion for guide 15 moves rearward along the guide groove 27. Further, as the shift lever 10 is tilted rearward as shown in FIG. 7C, the tip end portion of the leg portion for guide 15 moves forward along the guide groove 27. The shift lever 10 cannot move forward any more at the time the leg portion for guide 15 contacts a rear end portion 27b of the guide groove 27. In other words, the shift lever 10 is permitted to move longitudinally freely only within a range from its position where the leg portion for guide 15 contacts a front end portion 27a of the guide groove 27 to its other position where the leg portion for guide 15 contacts the rear end portion 27b of the guide groove 27. Herein, the inner diameter of the through hole 22a formed at the cover portion 22 of the body portion 20 is set at a specified diameter which is large enough to permit the longitudinal move of the lever portion 12 according to the move of the leg portion for guide 15 from the front end portion 27a to the rear end portion 27b of the guide groove 27.

Figure 3:
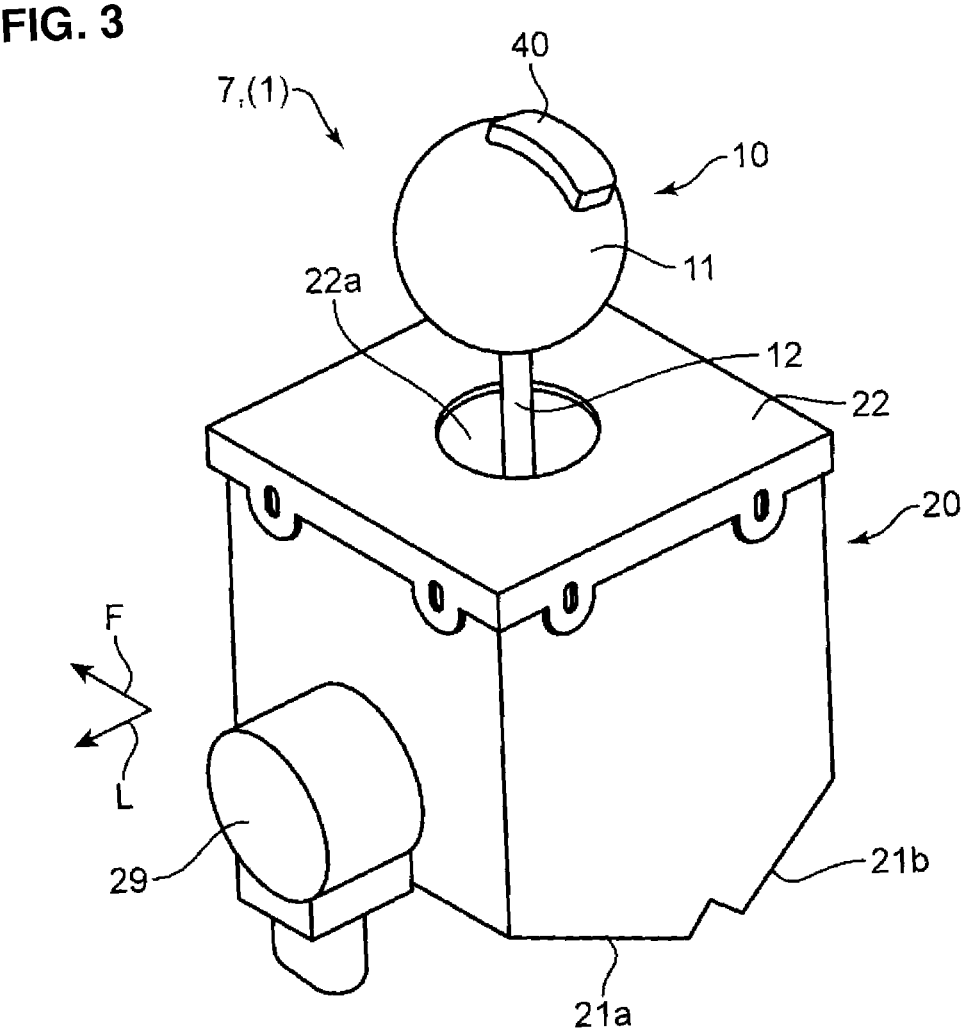
FIG. 3 is a perspective view of the shift device.
Figure 4:
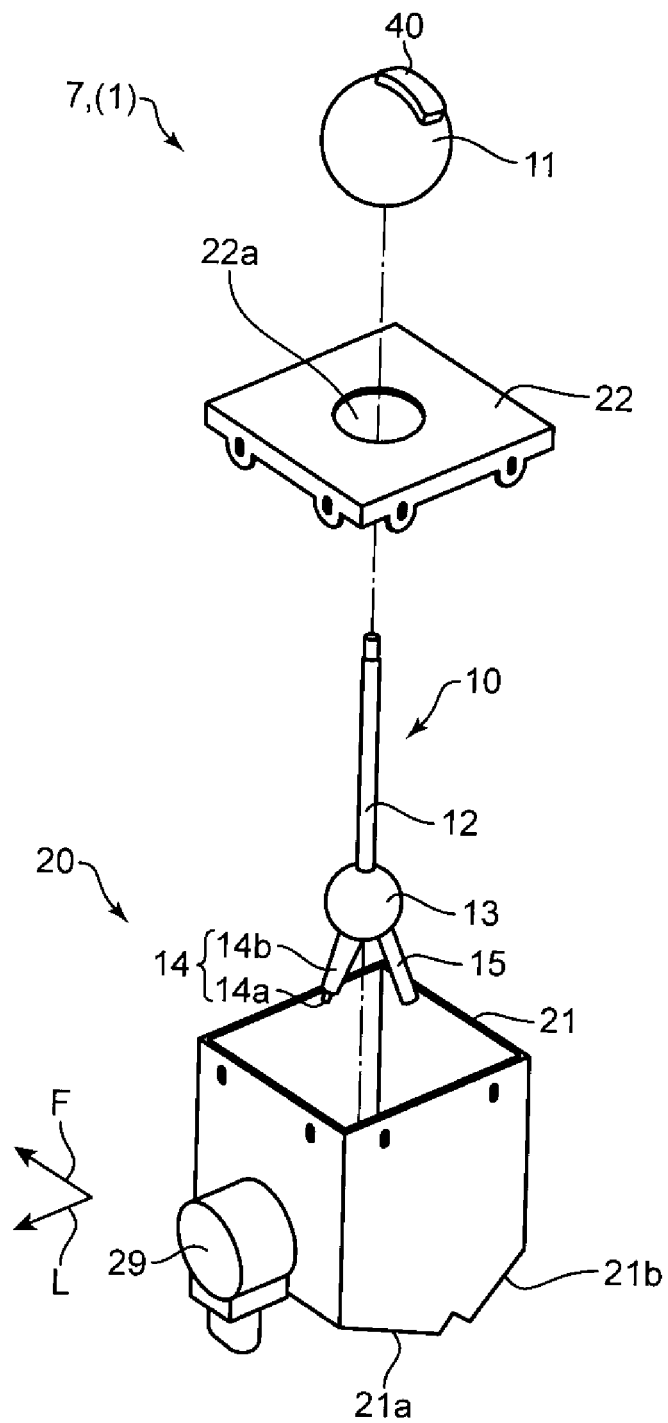
FIG. 4 is an exploded perspective view of the shift device.

As shown in FIGS. 3-5, a move amount sensor 29 to detect the amount of longitudinal move of the shift lever 10 is provided at a one-side face portion of the housing 21. Specifically, the move amount sensor 29 detects a rotational angle of a rotational shaft 28 which projects right and left from the sphere portion 13 of the shift lever 10 as the amount of longitudinal move of the shift lever 10. The rotational shaft 28 is provided to extend laterally inside the connection portions 24 which are provided between the lever support portion 23 and right and left side walls of the housing 21, and a one-end portion of the rotational shaft 28 extends up to the move amount sensor 29. When the shift lever 10 is tilted longitudinally, the rotational shaft 28 rotates by a specified angle which is proportional to the amount of move of the shifted shift lever 10, and this rotational angle of the rotational shaft 28 is detected electrically by the move amount sensor 29.

(2) Control System

Figure 8:
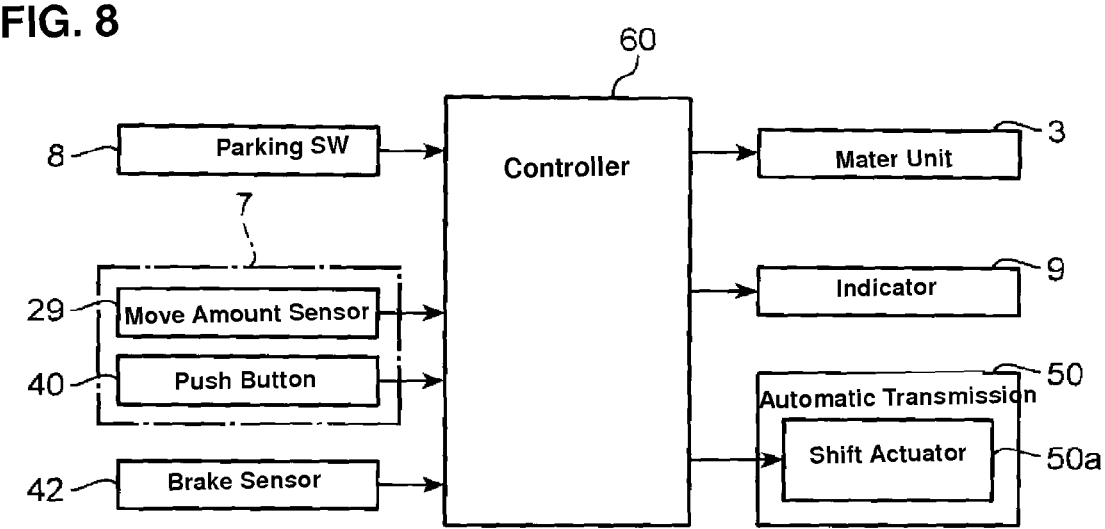
FIG. 8 is a block diagram showing a control system of the shift device.

FIG. 8 is a block diagram showing a control system relating to the shift device 1 of the first embodiment. A controller 60 shown in this figure is a microcomputer including well-known CPU, RAM, ROM and so on, which corresponds to a "controller" in the claims. That is, the controller 60 has functions of controlling operations of the automatic transmission 50 depending on operational states of the shift device 1 and the like. Herein, while it is illustrated as a single block in FIG. 8, the controller 60 may be comprised of plural microcomputers which are provided respectively on a vehicle-body side and an automatic-transmission 50 side, for example.

The controller 60 is electrically connected to the above-described parking switch 8, move amount sensor 29, push button 40, automatic transmission 50 (more specifically, its shift actuator 50a), indicator 9 and meter unit 3. Herein, the shift actuator 50a of the automatic transmission 50 is a solenoid valve or the like which switches connection/release of frictional connecting elements, such as clutches and brakes, which are stored at the automatic transmission 50, for example.

The vehicle is further equipped with a brake sensor (brake switch) 42 which detects whether the brake pedal is pressed (operated) or not. This brake sensor 42 is also electrically connected to the controller 60.

The controller 60 determines whether the parking switch 8 is pressed or not based on a signal of an electric contact stored at the parking switch 8. Further, the controller 60 determines in which longitudinal direction the shift lever 10 is tilted based on the signal of the move amount sensor 29, and determines whether the push button 40 is pressed or not based on a signal of an electric contact stored at the push button 40. And, the controller 60 executes switching control of shift ranges of the automatic transmission 50, indicating control of the indicator 9 and the meter unit 3 (control of indicating a current shift range) and others based on the operational states of the shift device 1 determined as described above.

The controller 60 also has a so-called shift lock function. That is, the controller 60 prohibits the switching to the other ranges from the parking range in a case in which it is confirmed based on the signal of the brake sensor 42 that the brake pedal is in an OFF state (i.e., when the brake pedal is not pressed).

(3) Shift Pattern

In the first embodiment, the shift patterns of the shift device 1 are set as shown in FIGS. 9A-9D and 10 under the control of the controller 60 described above. Hereinafter, contents of these figures will be described specifically.

(Shift Patterns from Parking Range)

Figure 9A:
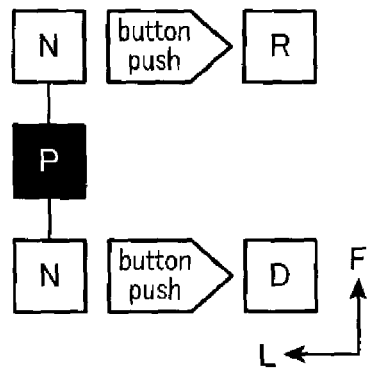
FIGS. 9A-9D are diagrams explaining shift patterns of the shift lever.

FIG. 9A shows shift patterns of a case in which the current shift range starts shifting operation from a state of the parking range. In this figure, "P" indicated at the center shows that the parking range is selected in a default state in which the shift lever 10 is held at the home position. "N" indicated in front of "P" shows that the shift range is switched to the neutral range when the shift lever 10 is tilted forward from the home position. Similarly, "N" indicated in back of "P" shows that the shift range is switched to the neutral range when the shift lever 10 is tilted rearward from the home position.

Further, "R" indicated on the right of the front-side "N" with a white arrow (button push) shows that the shift range is switched to the reverse range when the shift lever 10 is tilted forward and subsequently the push button 40 is pressed. Similarly, "D" indicated on the right of the rear-side "N" with a white arrow (button push) shows that the shift range is switched to the drive range when the shift lever 10 is tilted rearward and subsequently the push button 40 is pressed.

As described above, the shift patterns in the case of the current shift range being the parking range are as follows, as shown at the rows of "Current Range"="P" of the chart of FIG. 10.

Forward Lever Operation→Neutral Range
Forward Lever Operation & Button Push→Reverse Range
Rearward Lever Operation→Neutral Range
Rearward Lever Operation & Button Push→Drive Range Herein, in the shift patterns described above, tilting the shift lever 10 "rearward" for switching to the drive range corresponds to operationally moving it "in a first direction" in the claims, and tilting the shift lever 10 "forward for switching to the reverse range corresponds to operationally moving it "in a second direction" in the claims.

(Shift Patterns from Reverse Range)

Figure 9B:
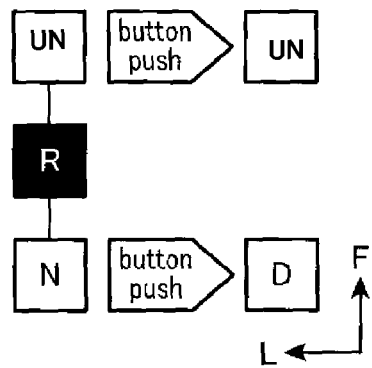

FIG. 9B shows shift patterns of a case in which the current shift range starts shifting operation from a state of the reverse range. In this figure, "UN" indicated in front of "R" which is indicated at the center and "UN" indicated on the right of this "UN." show that even if the shift lever 10 is tilted forward from the home position in a state in which the reverse range is selected and even if the push button 40 is further pressed from this forward-tilting state of the shift lever 10, these tilting or pressing operations are unavailable. In a case of these unavailable operations, the current range (the reverse range in this case) is maintained and also a massage to inform that the operations are unavailable is indicated on a specified indication portion at the meter unit 3, for example.

Contrary, in a case in which the shift lever 10 is tilted rearward from the home position in a state in which the reverse range is selected, the shift range is switched to the neutral range from the reverse range. Further, in a case in which the push button 40 is pressed additionally to the rearward tilting of the shift lever 10, the shift range is switched to the drive range.

As described above, the shift patterns in the case of the current shift range being the reverse range are as follows, as shown at the rows of "Current Range"="R" of the chart of FIG. 10.

Forward Lever Operation→Unavailable
Forward Lever Operation & Button Push→Unavailable
Rearward Lever Operation→Neutral Range
Rearward Lever Operation & Button Push→Drive Range (Shift Patterns from Neutral Range)

Figure 9C:
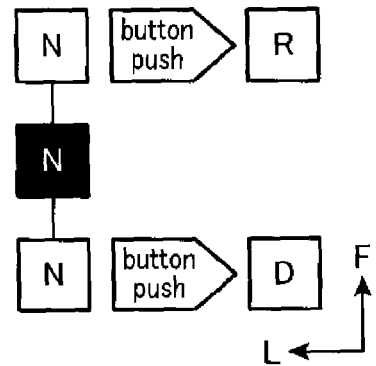

FIG. 9C shows shift patterns of a case in which the current shift range starts shifting operation from a state of the neutral range. According to this figure, even if the shift lever 10 is tilted forward or rearward from the home position in a state in which the current range is the neutral range, the shift range remains at the neural range, not change. Herein, since the operation itself is not unavailable, no message is indicated at the meter unit 3 in particular. Meanwhile, when the shift range is switched to the reverse range or the drive range from the neutral range, the same operations (the shift patterns from the parking range) as the above-described patterns of FIG. 9A are necessary. That is, for switching to the reverse range, it is necessary that the shift lever 10 is tilted forward and then the push button 40 is pressed further. For switching to the drive range, it is necessary that the shift lever 10 is tilted rearward and then the push button 40 is pressed further.

As described above, the shift patterns in the case of the current shift range being the neutral range are as follows, as shown at the rows of "Current Range"="N" of the chart of FIG. 10.

Forward Lever Operation→Neutral Range (maintaining of the current status)
Forward Lever Operation & Button Push→Reverse Range Rearward Lever Operation→Neutral Range (maintaining of the current status)

Rearward Lever Operation & Button Push→Drive Range (Shift Patterns from Drive Range)

Figure 9D:
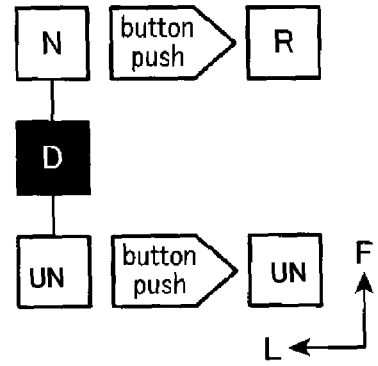

FIG. 9D shows shift patterns of a case in which the current shift range starts shifting operation from a state of the drive range. According to this figure, even if the shift lever 10 is tilted rearward from the home position in a state in which the current range is the drive range and even if the push button 40 is further pressed from this rearward-tilting state of the shift lever 10, these tilting or pressing operations are unavailable. Contrary, in a case in which the shift lever 10 is tilted forward, the shift range is switched to the neutral range from the drive range. Further, in a case in which the push button 40 is pressed additionally to the forward tilting of the shift lever 10, the shift range is switched to the reverse range.

As described above, the shift patterns in the case of the current shift range being the drive range are as follows, as shown at the rows of "Current Range"="D" of the chart of FIG. 10.

Forward Lever Operation→Neutral Range
Forward Lever Operation & Button Push→Reverse Range
Rearward Lever Operation→Unavailable
Rearward Lever Operation & Button Push→Unavailable Herein, in a case in which the push button 40 is pressed, keeping the shift lever 10 held at the home position, regardless of what the current shift range is, this pressing operation is unavailable (which is not illustrated).

Further, in a case in which the shift range is switched to the parking range from the other range, the parking switch 8 is pressed without using the shift lever 10. That is, in a case in which the parking switch 8 is pressed in a state in which the current shift range is the reverse range, the neutral range, or the drive range, the shift range is switched to the parking range simply.

(Determinative Logics at Traveling-Range Switching)

Hereinafter, determinative logics as to whether the switching to the traveling ranges is permitted or not will be described specifically. Herein, the traveling range means a shift range in which the drive force is transmitted to wheels (where traveling of the vehicle is permitted), which is any one of the drive range and the reverse range in the first embodiment. Contrary, a non-traveling range means a shift range in which the drive force's transmission to the wheels is shut off, which is any one of the parking range and the neutral range in the first embodiment.

As described above, in order to switch the shift range to the traveling range (the drive range or the neutral range) from the non-traveling range (the parking range or the neutral range), as shown in FIG. 9A or 9C, it is necessary to tilt the shift lever 10 forward or rearward and then the push button 40 is pressed further. At this time, the controller 60 determines whether or not the shift range can be switched to the drive range or the reverse range based on the mount of move (the forward or rearward rotational angle) of the shift lever 10 detected by the move amount sensor 29 and existence of the signal of the push button 40 (the signal generated at the time of the button pressing). That is, the controller 60 permits the switching to the drive range when two conditions: (i) the amount of rearward move of the shift lever 10 exceeds a specified value and (ii) there exists an input of the signal of the push button 40 are met. Further, the controller 60 permits the switching to the reverse range when two conditions: (iii) the amount of forward move of the shift lever 10 exceeds a specified value and (iv) there exists the input of the signal of the push button 40 are met.

Figure 11:
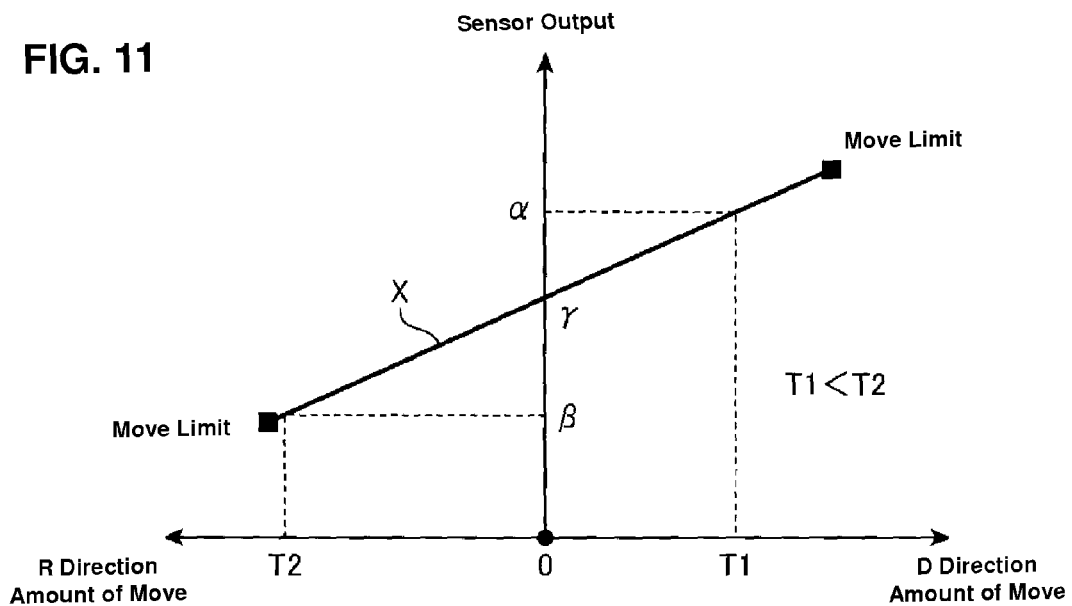
FIG. 11 is a graph explaining conditions of permitting switching to the drive range and the reverse range.

FIG. 11 is a graph explaining how the above-described conditions (i), (iii) relating to the shift lever 10 are determined. In this graph, the axis of abscissas shows the amount of move of the shift lever 10, and the axis of ordinates shows the output value of the move amount sensor 29. A point at the amount of move being zero (0) is shown at the center of the axis of abscissas, and the amount of move of the shift lever 10 moving in a switching direction to the drive range (in a D direction) is shown on the right side of the axis's center, whereas the amount of move of the shift lever 10 moving in a switching direction to the reverse range (in a R direction) is shown on the left side of the axis's center. In the first embodiment, as described above, the shift lever 10 is tilted rearward in order to switch to the drive range, and the shift lever 10 is tilted forward in order to switch to the reverse range. Therefore, the D direction in the graph means the rearward direction, and the R direction in the graph means the forward direction. Further, in FIG. 11, the amount of move in a case in which the shift lever 10 is moved up to its limit (until the leg portion for guide 15 contacts the front or rear end portions 27a, 27b of the guide groove 27 as shown in FIG. 7B or 7C) is shown as "move limit." This move limit is identical on both sides of the rearward (the D direction) side and the forward (the R direction) side.

As shown by a characteristic line X in the graph of FIG. 11, the output value of the move amount sensor 29 changes proportionally to the amount of longitudinal move of the shift lever 10 from the home position. Specifically, when the sensor output at the time of the shift lever 10 being located at the home position is y, the sensor output at the time of the shift lever 10 being tilted rearward (in the D direction) increases (becomes greater than y) proportionally to the mount of rearward move of the shift lever 10, whereas the sensor output at the time of the shift lever 10 being tilted forward (in the R direction) decreases (becomes smaller than y) proportionally to the mount of forward move of the shift lever 10.

In the graph of FIG. 11, the amount of rearward move T1 of the shift lever 10 (in the D direction) and the amount of forward move T2 of the shift lever 10 (in the R direction) are thresholds for determining whether the above-described conditions (i), (iii) are met or not. Hereinafter, T1 and T2 will be referred to as a "first threshold" and a "second threshold," respectively.

The controller 60 recognizes that the amount of rearward move of the shift lever 10 exceeds the first threshold T1 when the output value of the move amount sensor 29 becomes greater than a specified value a, thereby determining that the above-described condition (i) for switching the shift range to the drive range has been met. Further, in a case in which, additionally to this, the above-described condition (ii) has been also met with the push button 40 being pressed, the controller 60 switches the shift range to the drive range.

Further, the controller 60 recognizes that the amount of forward move of the shift lever 10 exceeds the second threshold T2 when the output value of the move amount sensor 29 becomes smaller than a specified value β, thereby determining that the above-described condition (iii) for switching the shift range to the reverse range has been met. Further, in a case in which, additionally to this, the above-described condition (iv) has been also met with the push button 40 being pressed, the controller 60 switches the shift range to the reverse range.

Herein, as apparent from the graph of FIG. 11, the second threshold T2 to be used for switching to the reverse range is set to be greater than the first threshold T1 to be used for switching to the drive range. That is, in a case in which the shift lever 10 is tilted rearward, when the amount of rearward move of the shift lever 10 exceeds the first threshold T1 and also the push button 40 is pressed further, the switching to the drive range is permitted. Meanwhile, in a case in which the shift lever 10 is tilted forward, when the amount of forward move of the shift lever 10 exceeds the second threshold T2 which is greater than the first threshold T1 and also the push button 40 is pressed further, the switching to the reverse range is permitted.

The second threshold T2 to be used for switching to the reverse range is set at a specified value close to the move limit on the side of the forward (in the R direction) move of the shift lever 10. Meanwhile, the first threshold T1 to be used for switching to the drive range is set at a specified value that is smaller than the move limit on the side of the rearward (in the D direction) move of the shift lever 10. Thus, the first threshold T1 is set to be smaller than the second threshold T2. For example, the amount of move of the shift lever 10 in a case in which the leg portion for guide 15 reaches a point that is about 1 mm before the rear end portion 27b (a wall portion to provide the move limit for the forward move of the shift lever 10) of the guide groove 27 can be set as the second threshold T2, and the amount of move of the shift lever 10 in a case in which the leg portion for guide 15 reaches a point that is about 5 mm before the front end portion 27a (a wall portion to provide the move limit for the rearward move of the shift lever 10) of the guide groove 27 can be set as the first threshold T1.

The above-described matters are also applicable to a case of switching between the traveling ranges, i.e., when the shift range is switched from the reverse range to the drive range or switched from the drive range to the reverse range. For example, while the shift lever 10 is tilted rearward when the shift range is switched to the drive range from the reverse range (see FIG. 9B) and the shift lever 10 is tilted forward when the shift range is switched to the reverse range from the drive range (see FIG. 9D), the above-described first threshold T1 and second threshold T2 are used as the thresholds of the amount of move of the shift lever 10 which are used for the above-described respective cases.

That is, in a case in which the current shift range is the reverse range (FIG. 9B), the shift range is switched to the drive range from the reverse range when the amount of rearward move of the shift lever 10 exceeds the first threshold T1 and then the push button 40 is pressed. And, in another case in which the current shift range is the drive range (FIG. 9D), the shift range is switched to the reverse range from the drive range when the amount of forward move of the shift lever 10 exceeds the second threshold T2 and then the push button 40 is pressed.

(4) Operations Etc.

As described above, according to the shift device 1 of the first embodiment, the neutral range is selected when the shift lever 10 is tilted forward or rearward from the home position in the state in which the non-traveling range (the parking range, the neutral range) is selected as the shift range, and the shift range is switched to the drive range or the reverse range when the push button 40 is pressed additionally to the tilting of the shift lever 10. The switching to the drive range is executed when the push button 40 is pressed further in the state in which the amount of move of the shift lever 10 tilted rearward from the home position exceeds the first threshold T1. The switching to the reverse range is executed when the push button 40 is pressed further in the state in which the amount of move of the shift lever 10 tilted forward from the home position exceeds the second threshold T2 that is greater than the first threshold T1. According to the shift device 1 described above, the traveling range can be selected quickly and easily, ensuring the safety.

That is, according to the above-described first embodiment, even when the shift lever 10 is tilted forward or rearward from the home position in the state in which the non-traveling range is selected, the shift range is merely switched to the neutral range, not switched to the traveling range (the drive range or the reverse range) unless the push button 40 is pressed further in this state. Therefore, even if there is an erroneous operation, such as inadvertent touching of a hand of the driver or the like with the shift lever 10, any improper situation in which the vehicle starts improperly against the driver's intent can be avoided, so that the safety of the vehicle can be ensured properly.

Herein, it may be considered as another safety measure than the first embodiment that it is required to press the push button 40 first at the time of the switching to the traveling range. That is, the switching to the traveling range is permitted when the push button 40 is pressed first in the state in which the shift lever 10 is located at the home position and then the shift lever 10 is tilted, keeping the push button 40 being pressed. In this case, however, it is necessary to tilt the shift lever 10, gripping the shift knob 11 firmly, in order to press the push button 40, which may cause the driver wanting a quick and easy operation to have troublesome feelings.

Meanwhile, according to the first embodiment, when it is wanted to switch the shift rage to the traveling range (the drive range or the reverse range), this switching can be achieved simply by tilting the shift lever 10 first and then pressing the push button 40. Therefore, the driver may not be burdened so much in an initial stage of the operation and can conduct the switching operation to the traveling range quickly and easily accordingly. That is, differently from the above-described case in which it is required to press the push button 40 first, there is no need to operate the shift lever 10, keeping the push button 40 being pressed. Therefore, the driver may not need to grip the shift lever 10 firmly and can move the shift lever 10 through a relatively light and easy action. And, since the traveling range can be selected by operating the shift lever 10 and then pressing the push button 40, the superior operability can be obtained, ensuring the safety.

Further, according to the first embodiment, when the shift lever 10 is tilted rearward for switching to the drive range, the pressing operation of the push button 40 is accepted so as to switch to the drive range on condition that the amount of move from the home position of the shift lever 10 exceeds the first threshold T1. Meanwhile, when the shift lever 10 is tilted forward for switching to the reverse range, the pressing operation of the push button 40 is not accepted (the switching to the reverse range is not permitted) unless the amount of move from the home position of the shift lever 10 exceeds the second threshold T2 greater than the first threshold T1. If the amount of move of the shift lever 10 which is necessary for switching to the reverse range (the second threshold T2) is set to be greater than the amount of move of the shift lever 10 which is necessary for switching to the drive range (the first threshold T1) as described above, the driver is required to operate the shift lever 10 more greatly (up to the vicinity of the move limit) at the time of switching to the reverse range to move the vehicle backward. Thereby, the driver who tries to move the vehicle backward can be urged to operate carefully, so that the safety can be improved.

Embodiment 2

Figure 12:
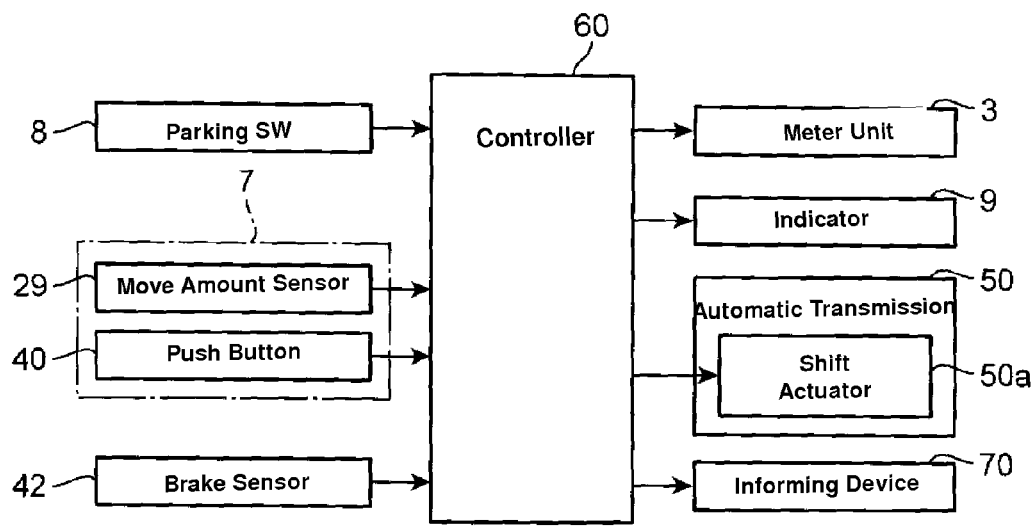
FIG. 12 is a diagram explaining a shift device according to a second embodiment of the present invention.

FIG. 12 is a block diagram showing a shift device according to a second embodiment of the present invention. The shift device of the second embodiment further comprises an informing device 70 which informs the driver that the state in which the pressing operation of the push button 40 is acceptable is established at the time of switching to the drive range or the reverse range, which is only a different point from the shift device 1 of the above-described first embodiment. The other constitutions are the same as the shift device 1 of the above-described first embodiment. That is why the same reference characters as the other constitutions than the informing device 70 of the first embodiment (FIGS. 1-11) are used in FIG. 12.

The informing device 70 is configured to provide specified information to the driver, respectively, when the amount of move of the shift lever 10 tilted rearward from the home position for the switching to the drive range exceeds the first threshold T1 and when the amount of move of the shift lever 10 tilted forward from the home position for the switching to the reverse range exceeds the second threshold T2. Specific means for providing the specified information may be, but not limited to, a speaker to generate some effective sounds or the like, or an indicator to indicate some letters or messages at the meter unit 3.

For example, in the case in which the current shift range is the parking range or the neutral range (see FIGS. 9A and 9C), the informing device 70 is operated (works) when the amount of move of the shift lever 10 which is tilted rearward by the driver for switching to the drive range exceeds the first threshold T1 shown in FIG. 11. Likewise, in the case in which the current shift range is the reverse range (see FIG. 9B), the informing device 70 is operated (works) when the amount of move of the shift lever 10 tilted rearward exceeds the first threshold T1, too.

Further, for example, in the case in which the current shift range is the parking range or the neutral range, the informing device 70 is operated (works) when the amount of move of the shift lever 10 which is tilted forward by the driver for switching to the reverse range exceeds the second threshold T2 shown in FIG. 11. Likewise, in the case in which the current shift range is the drive range (see FIG. 9D), the informing device 70 is operated (works) when the amount of move of the shift lever 10 tilted forward exceeds the second threshold T2, too.

According to the second embodiment described above, the driver can recognize, based on the information provided by the informing device 70 which is operated (works) when the amount of move of the shift lever 10 exceeds the first threshold T1 or the second threshold T2, that the pressing operation of the push button 40 is acceptable, that is—that the shift range is switchable to drive range or the reverse range through an additional pressing operation of the push button 40. Accordingly, the timing of the pressing operation of the push button 40 to be conducted becomes easily understandable, so that the operability of the shift device can be further improved.

Embodiment 3

Figure 13:
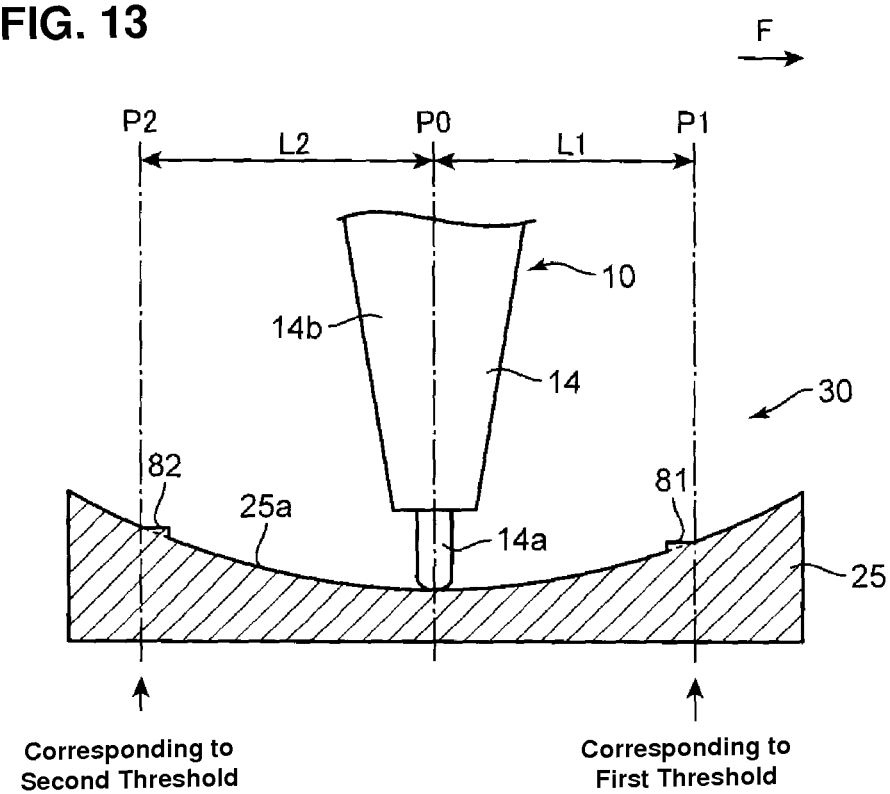
FIG. 13 is a diagram explaining a shift device according to a third embodiment of the present invention.
Figure 14:
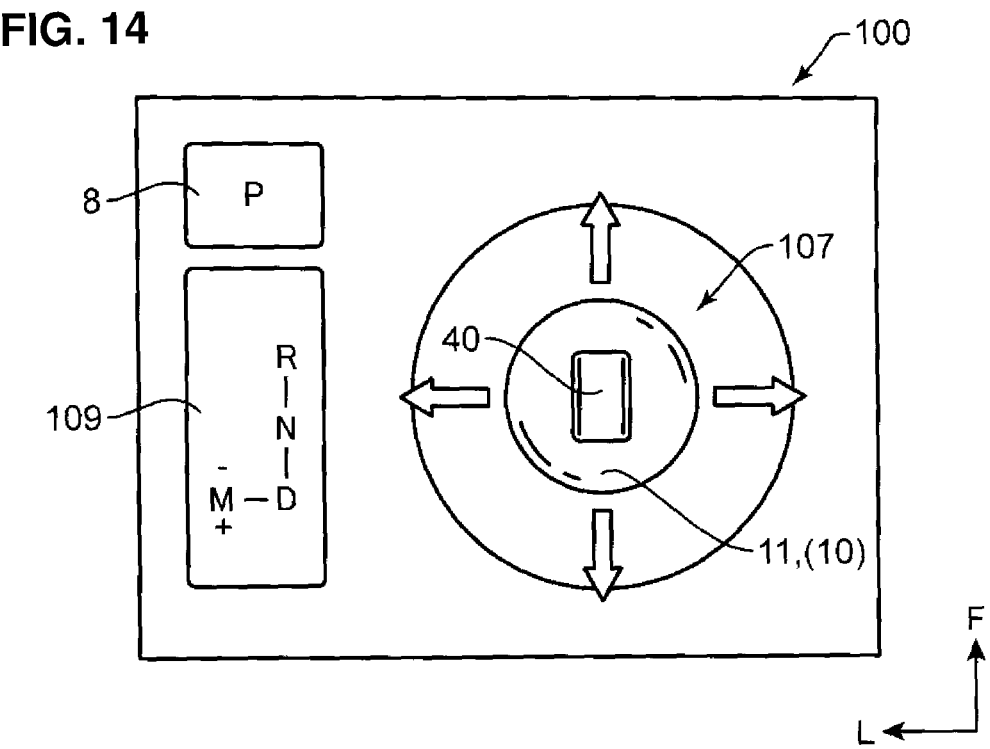
FIG. 14 is a plan view of a shift device according to a fourth embodiment of the present invention.

FIG. 13 is a diagram explaining a shift device according to a third embodiment of the present invention. In the shift device of the third embodiment, the detent mechanism 30 which automatically returns the shift lever 10 to the home position is worked on in a different manner from the first embodiment.

Specifically, in the third embodiment, a first projection 81 and a second projection 82 are provided on the sphere-shaped receipt face 25*a* of the guide member 25. The first projection 81 corresponds to a "first resistance-applying member" in the claims, which can temporarily increase a resistant force for the shift lever 10 right before the amount of move of the shift lever 10 tilted rearward has exceeded the first threshold T1 (FIG. 11). The second projection 82 corresponds to a "second resistance-applying member" in the claims, which can temporarily increase another resistant force for the shift lever 10 right before the amount of move of the shift lever 10 tilted forward has exceeded the second threshold T2 (FIG. 11). Hereinafter, the details will be described.

In FIG. 13, the position of the biasing portion 14*a* when the shift lever 10 is located at the home position (i.e., the position corresponding to the center of the sphere-shaped receipt face 25*a*) is shown by reference character P0, the position of the biasing portion 14*a* when the amount of move of the shift lever 10 tilted rearward reaches the first threshold T1 is shown by reference character P1, and the position of the biasing portion 14*a* when the amount of move of the shift lever 10 tilted forward reaches the second threshold T2 is shown by reference character P2. Herein, as understood from the structure of the shift device described above, since the leg portion for detent 14 moves rearward as the shift lever 10 is moved forward and the leg portion for detent 14 moves forward as the shift lever 10 is moved rearward, the position P1 corresponding to the first threshold T1 is located in front of the center of the sphere-shaped receipt face 25*a* and the position P2 corresponding to the second threshold T2 is located in back of the center of the sphere-shaped receipt face 25*a*. Further, since the second threshold T2 is greater than the first threshold T1, a distance L2 between the position P0 which corresponds to the home position and the position P2 which corresponds to the second threshold T2 is greater than a distance L1 between the position P0 which corresponds to the home position and the position P1 which corresponds to the first threshold T1.

The first projection 81 is located slightly toward the center of the sphere-shaped receipt face 25*a* from the position P1 of the biasing portion 14*a* when the amount of move of the shift lever 10 tilted rearward reaches the first threshold T1. Accordingly, in the case in which the shift lever 10 is tilted rearward, the biasing portion 14*a* contacts the first projection 81 right before the amount of move of this shift lever 10 has exceeded the first threshold T1, so that the resistant force for the shift lever 10 increases. Then, when the shift lever 10 is tilted rearward further from this state, the biasing portion 14*a* rides over the first projection 81, so that the resistant force for the shift lever 10 decreases. After the resistant force decreases, only slightly-rearward tilting of the shift lever 10 makes the amount of move of the shift lever 10 exceed the first threshold T1.

The second projection 82 is located slightly toward the center of the sphere-shaped receipt face 25*a* from the position P2 of the biasing portion 14*a* when the amount of move of the shift lever 10 tilted forward reaches the second threshold T2. Since the distance L2 between P0-P2 is greater than the distance L1 between P0-P1 as described above, a distance between the center of the sphere-shaped receipt face 25*a* and the second projection 82 is set to be greater than a distance between the center of the sphere-shaped receipt face 25*a* and the first projection 81 accordingly. Since the second projection 82 described above is provided, in the case in which the shift lever 10 is tilted forward, the biasing portion 14*a* contacts the second projection 82 right before the amount of move of the shift lever 10 has reached the second threshold T2, so that the resistant force for the shift lever 10 increases. Then, when the shift lever 10 is tilted forward further from this state, the biasing portion 14*a* rides over the second projection 82, so that the resistant force for the shift lever 10 decreases. After the resistant force decreases, only slightly-forward tilting of the shift lever 10 makes the amount of move of the shift lever 10 exceed the second threshold T2.

In the case in which the resistant force for the shift lever 10 is increased temporarily right before the amount of move of the shift lever 10 has exceeded the first threshold T1 or the second threshold T2 like the above-described third embodiment, the driver can recognize, based on clicking feelings caused by a change of the resistant force, that the pressing operation of the push button 40 is acceptable, that is—that the shift range is switchable to the drive range or the reverse range through additional pressing of the push button 40. Accordingly, the timing of the pressing of the push button 40 becomes easily understandable, so that the operability of the shift device can be further improved.

Embodiment 4

FIGS. 14-20 are diagrams showing mechanical or electrical constitutions of a shift device 100 according to a fourth embodiment of the present invention. While the shift device 1 of the first embodiment is configured to switch the shift range among the four ranges of the parking range, the reverse range, the neutral range, and the drive range, the shift device 100 of the fourth embodiment is configured to be able to switch to a manual range in addition to the four ranges. The manual range is a shift range where the drive force is transmitted in a direction of making the vehicle travel forward, and the manual range is the same as the drive range in this sense. In a case of the manual range, however, it is possible to switch forward-traveling gears intentionally by using the shift lever 10, which is a unique function that the drive range does not have. For example, in a case in which the automatic transmission 50 has six forward-traveling speed gears, an up-shift operation to shift up the gears one by one and a down-shift operation to shift down the gears one by one are possible among the first-sixth speed gears.

Since the manual range is added as described above, an indicator 109 of the fourth embodiment (FIG. 14) includes a letter plate of "M" representing the manual range in addition to the letter plates of "R" representing the reverse range, "N" representing the neutral range, and "D" representing the drive range, which is different from the indicator 9 of the first embodiment (see FIG. 2).

Further, the fourth embodiment is different from the first embodiment in a specific structure of a main operational portion 107. Specifically, in the main operational portion 107 of the fourth embodiment, the shift lever 10 is supported so as to be tilted not only longitudinally but also laterally in order to enable switching from the drive range to the manual range as well as switching in its reverse direction. The others are basically the same as the main operational portion 7 of the first embodiment, so different points from the first embodiment will be described primarily.

The main operational portion 107 of the fourth embodiment comprises the shift lever 10 and the body portion 20 which supports the shift lever 10 so that that the shift lever 10 can be tilted, similarly to the main operational portion 7 of the first embodiment. However, the shift lever 10 of the fourth embodiment further includes, differently from the first embodiment, a swing piece 91 in addition to the shift knob 11, the lever portion 12, the sphere portion 13, the leg portion for detent 14, and the leg portion for guide 15. This swing piece 91 is configured to extend downward from the sphere portion 13 and then bends forward.

Further, the body portion 20 of the fourth embodiment comprises a guide member 96 which has a guide groove 97 which the leg portion for guide 15 engages with. The guide groove 97 is formed in a cross shape in a plan view, differently from the guide groove 27 of the first embodiment.

Specifically, the guide groove 97 is comprised of a first groove portion 97A which extends longitudinally and a second groove portion 97B which extends laterally, crossing the first groove portion 97A. The leg portion for guide 15 engages with and slides along the cross-shaped guide groove 97, so that the shift lever 10 is supported so as to be tilted longitudinally and laterally.

Figure 18A:
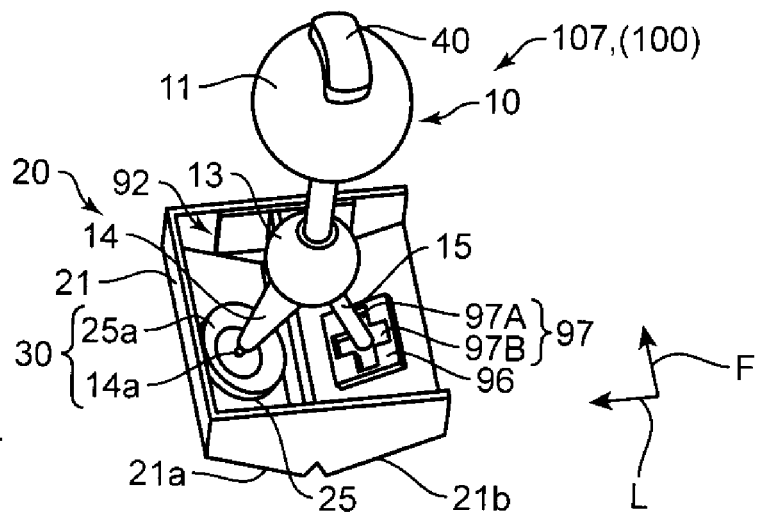
FIGS. 18A-18C are diagrams explaining moves of the above-described shift lever.

FIG. 18A shows a state in which the shift lever 10 is located at the home position. When the shift lever 10 is located at the home position, that is—when the shift lever 10 stands upright with the biasing portion 14*a* being positioned at the center of the sphere-shaped receipt face 25*a*, the tip end portion of the leg portion for guide 15 is arranged at a central portion of the guide groove 97, i.e., at a cross point between the first groove portion 97A and the second groove portion 97B.

Figure 18B:
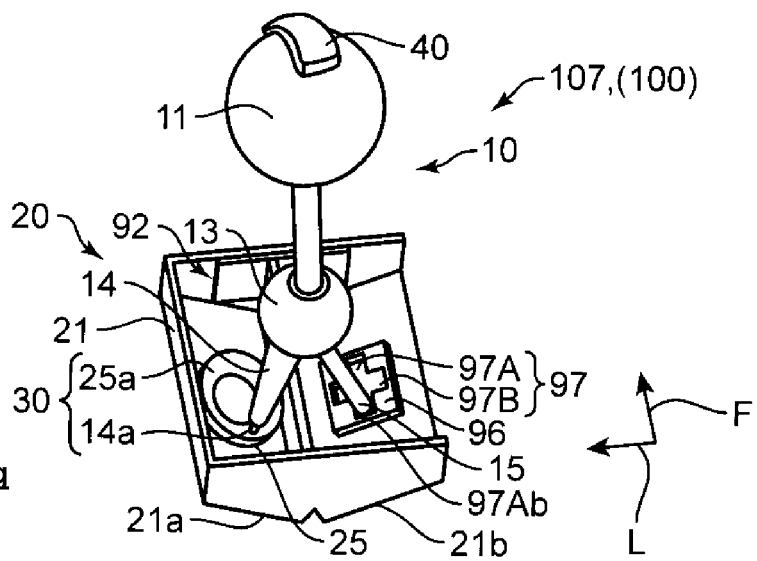
Figure 18C:
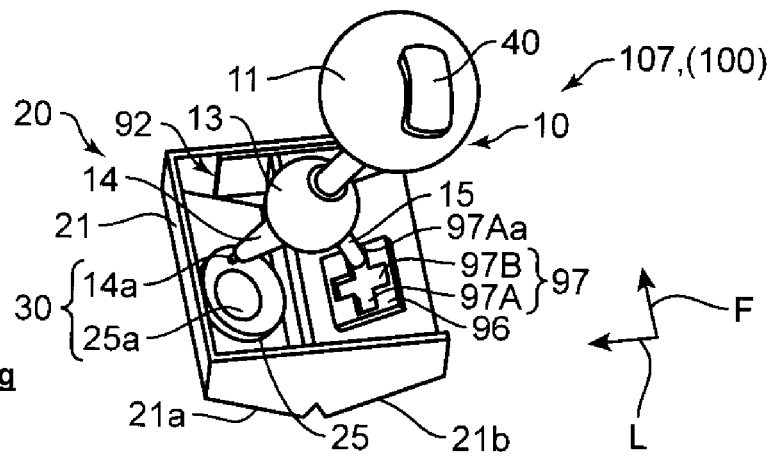

As the shift lever 10 is tilted forward from this state as shown in FIG. 18B, the tip end portion of the leg portion for guide 15 moves rearward along the first groove portion 97A. Further, as the shift lever 10 is tilted rearward as shown in FIG. 18C, the tip end portion of the leg portion for guide 15 moves forward along the first groove portion 97A. Then, when the leg portion for guide 15 contacts a rear end portion 97Ab of the first groove portion 97A, the shift lever 10 cannot move forward further. Likewise, when the leg portion for guide 15 contacts a front end portion 97Aa of the first groove portion 97A, the shift lever 10 cannot move rearward further. In other words, the shift lever 10 can be tilted longitudinally freely within a range from its position where the leg portion for guide 15 contacts the front end portion 97Aa of the first groove portion 97A to its position where the leg portion for guide 15 contacts the rear end portion 97Ab of the first groove portion 97A.

Figure 19A:
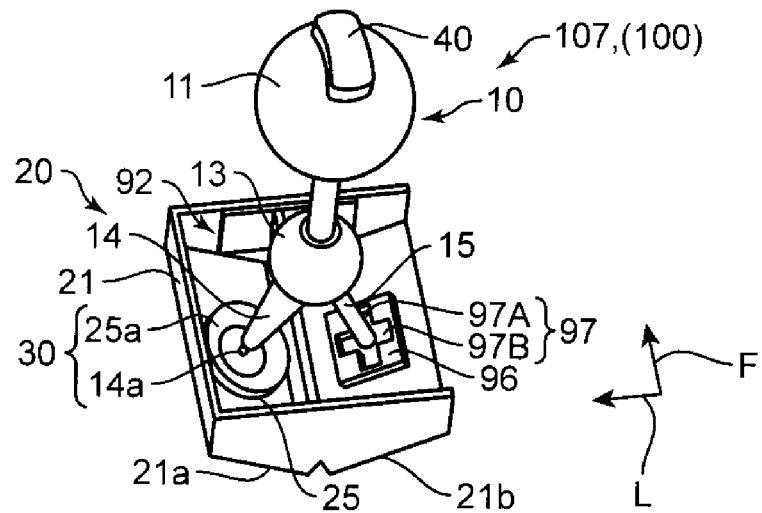
FIGS. 19A-19C are diagrams explaining moves of the above-described shift lever.
Figure 19B:
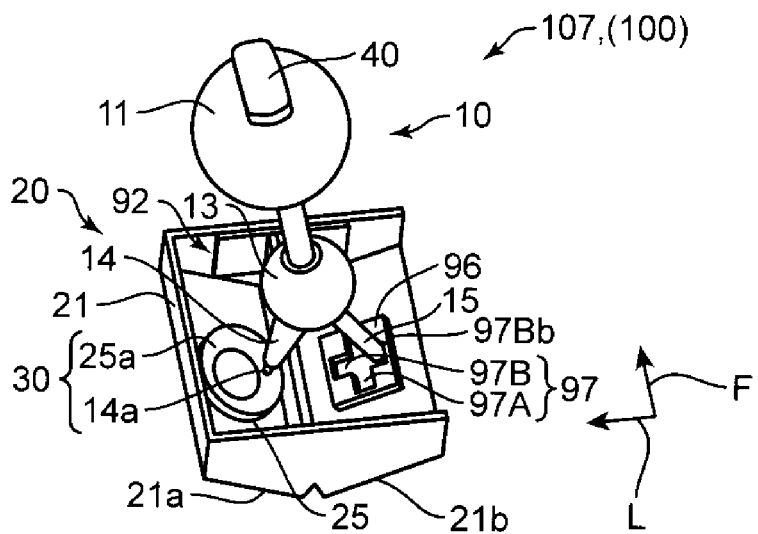
Figure 19C:
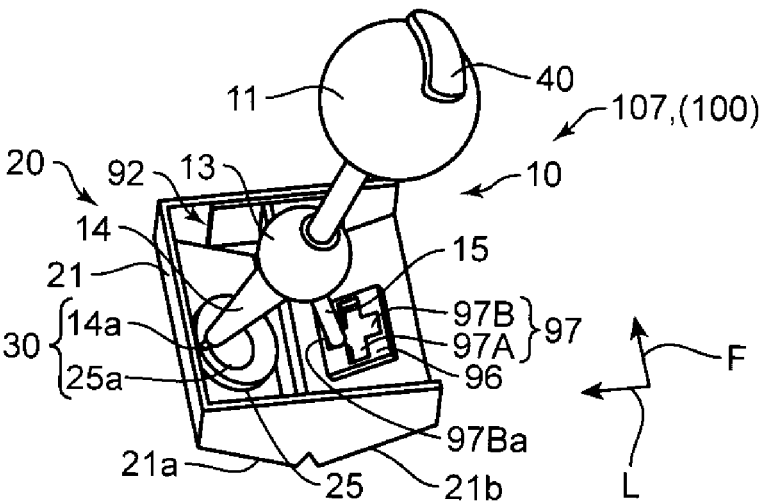

FIG. 19A shows a state in which the shift lever 10 is located at the home position like the FIG. 18A. As the shift lever 10 is tilted left from this state as shown in FIG. 19B, the tip end portion of the leg portion for guide 15 moves right along the second groove portion 97B. Further, as the shift lever 10 is tilted right as shown in FIG. 19C, the tip end portion of the leg portion for guide 15 moves left along the second groove portion 97B. Then, when the leg portion for guide 15 contacts a right end portion 97Bb of the second groove portion 97B, the shift lever 10 cannot move left further. Likewise, when the leg portion for guide 15 contacts a left end portion 97Ba of the second groove portion 97B, the shift lever 10 cannot move right further. In other words, the shift lever 10 can be tilted laterally freely within a range from its position where the leg portion for guide 15 contacts the left end portion 97Ba of the second groove portion 97B to its position where the leg portion for guide 15 contacts the right end portion 97Bb of the second groove portion 97B.

Figure 15:
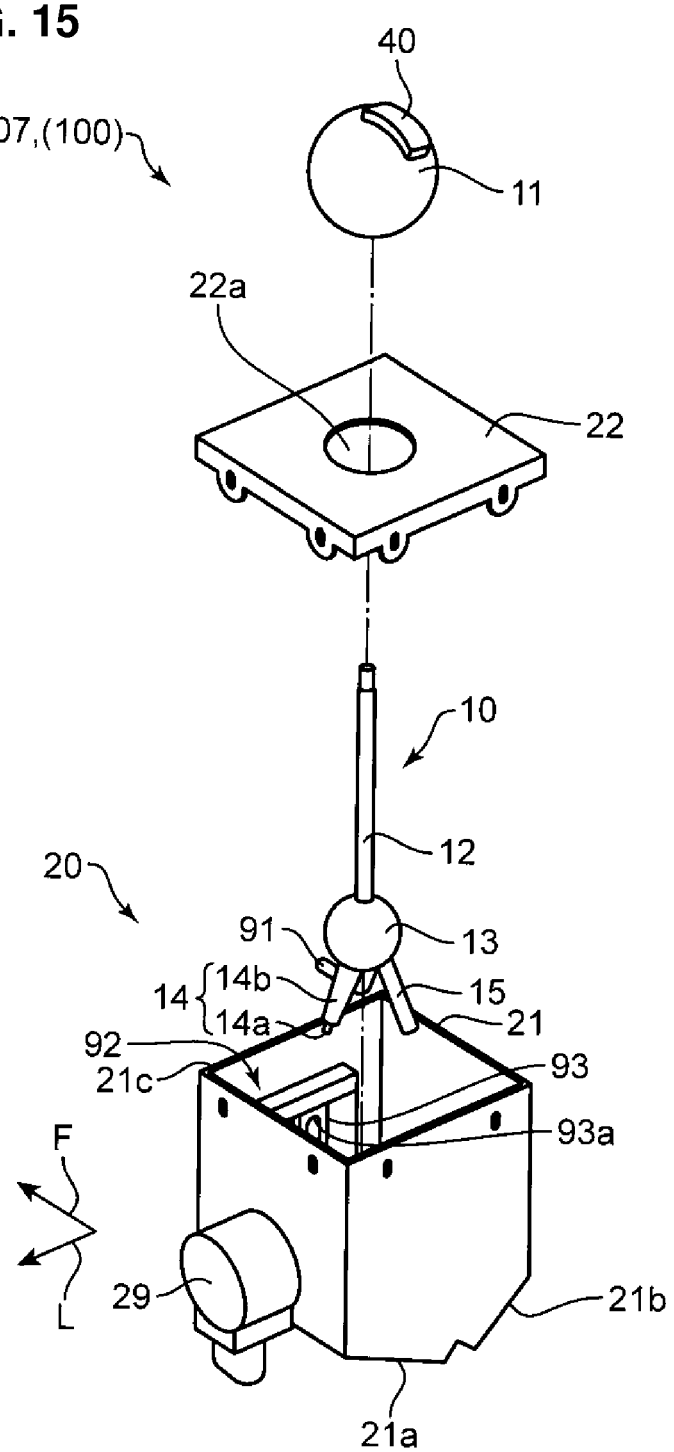
FIG. 15 is an exploded perspective view of the above-described shift device.
Figure 16:
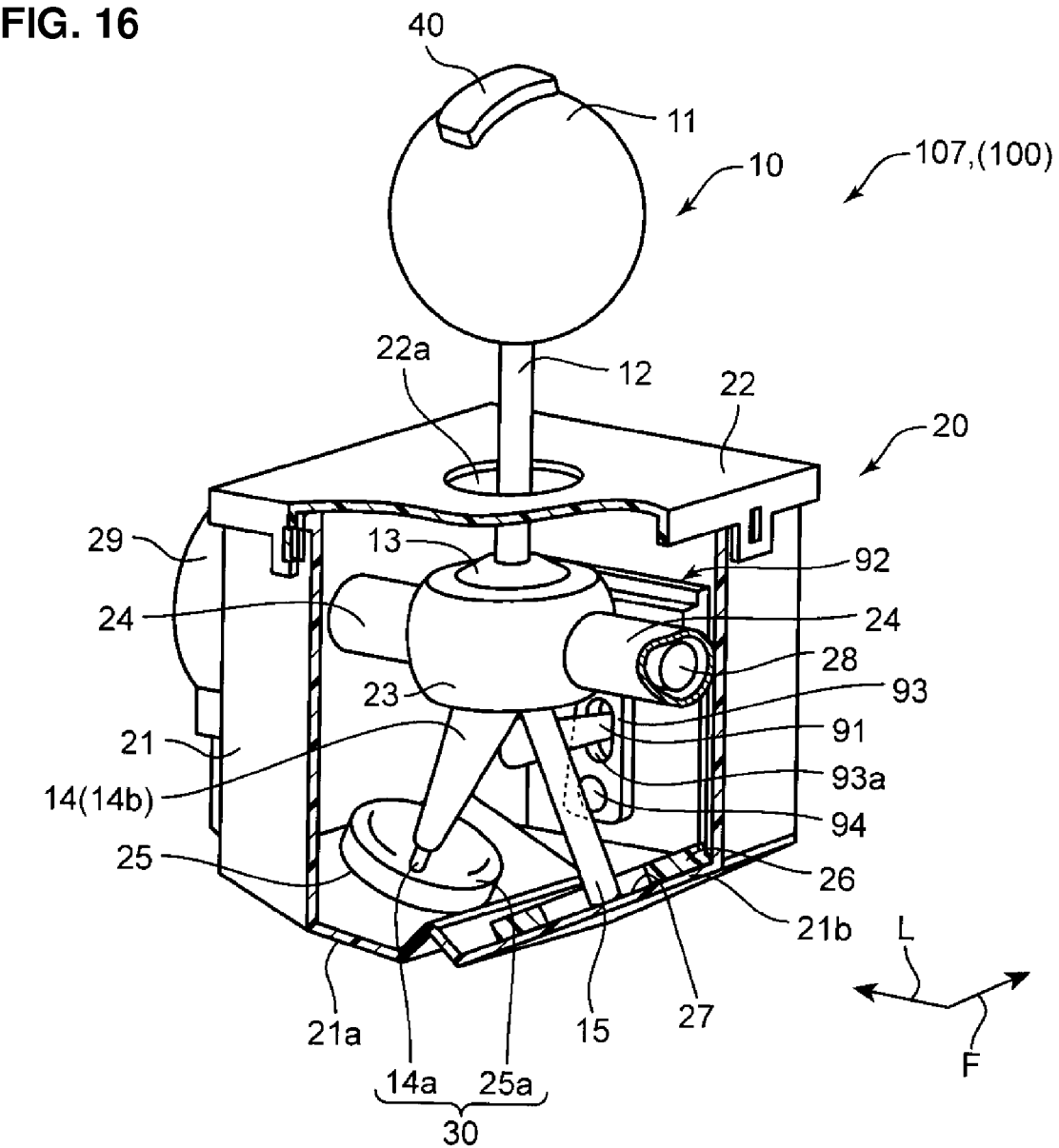
FIG. 16 is a perspective view of the above-described shift device, a part of which is cut off.
Figure 17:
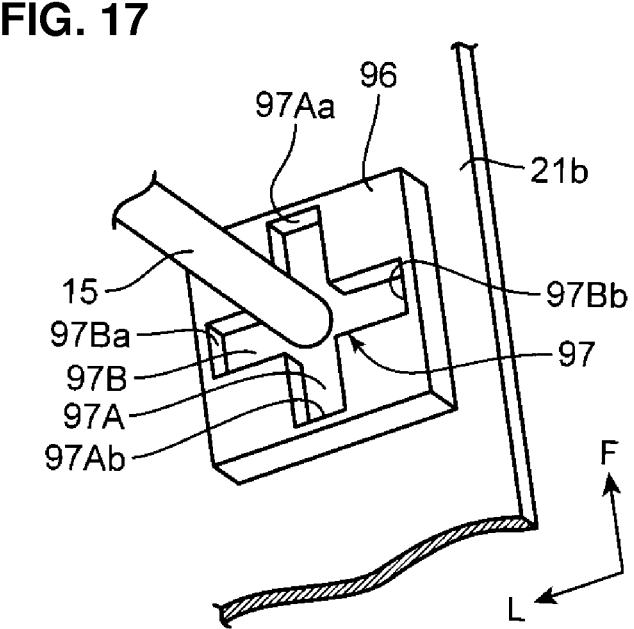
FIG. 17 is a diagram explaining a guide mechanism of a shift lever which is used at the above-described shift device.

As shown in FIGS. 15 and 16, a lateral-move amount sensor 92 which detects the amount of lateral move of the shift lever 10 is provided at the inside of the body portion 20. Specifically, the lateral-move amount sensor 92 detects the amount of swing of a swing member 93 which is pivoted at an inner face of a front wall portion 21*c* of the housing 21 as the amount of lateral move of the shift lever 10. The swing member 93 is comprised of a vertically-long plate member, a lower portion of which is pivoted at the front wall portion 21*c* of the housing 21 via a swing axis 94, thereby the swing member 93 is supported so as to swing laterally around the swing axis 94. A vertically-long hole 93*a* is formed at a vertically-central portion of the swing member 93. An end portion of the swing piece 91 of the shift lever 10 is inserted into the long hole 93*a*. The swing piece 91 inserted into the long hole 93*a* moves so as to push the swing member 93 in a reverse direction as the shift lever 10 is tilted laterally. The amount of swing of an upper end portion of the swing member 93 which swings laterally according to the pushing of the swing piece 91 is detected by the lateral-move amount sensor 92.

Figure 20:
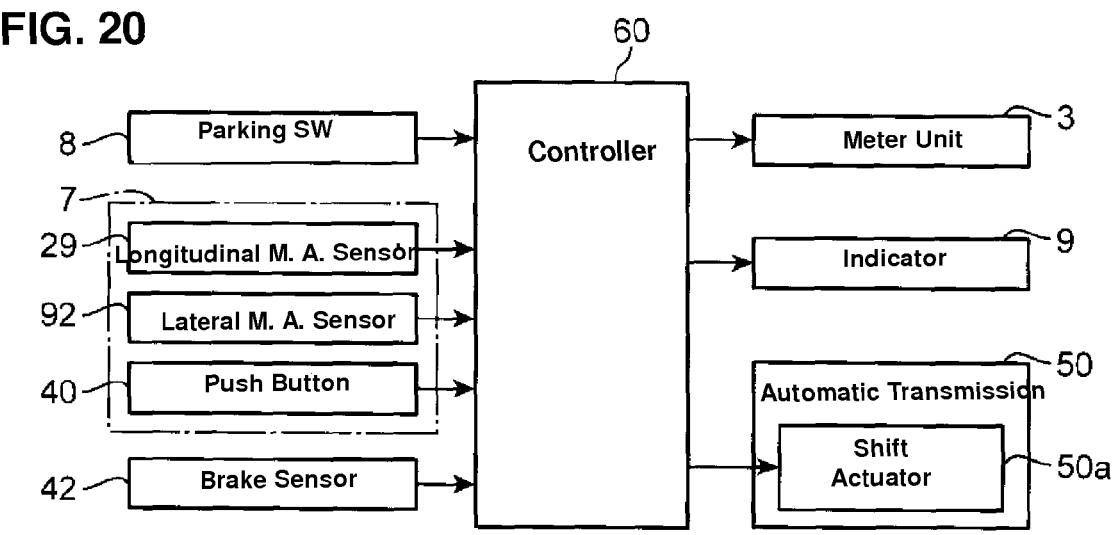
FIG. 20 is a block diagram showing a control system of the above-described shift device.

As shown in the block diagram of FIG. 20, the lateral-move amount sensor 92 is electrically connected to the controller 60. The amount of swing of the swing member 93 (i.e., the amount of lateral move of the shift lever 10) which is detected by the lateral-move amount sensor 92 is inputted to the controller 60 as an electrical signal. Herein, a longitudinal-move amount sensor 29 shown in FIG. 20 is the same as the move amount sensor 29 of the first embodiment, which detects the rotational angle of the rotational shaft 28 (FIG. 16) as the amount of longitudinal move of the shift lever 10.

The controller 60 determines the operational state of the shift lever 10 (in which direction, i.e., longitudinally or laterally, the shift lever 10 is tilted from the home position) based on detection signals of the rotational angle and the amount of swing which are inputted from the longitudinal-move amount sensor 29 and the lateral-move amount sensor 92. The controller 60 also determines whether the push button 40 is pressed or not based on a signal of an electric contact of the push button 40. The controller 60 controls the shift ranges (gears) of the automatic transmission 50 based on respective determination results. Hereinafter, the shift patterns will be described referring to FIGS. 21A-21E and 22.

(Shift Patterns from Parking Range)

Figure 21A:
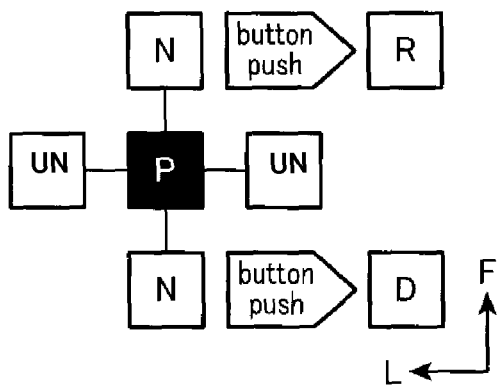
FIGS. 21A-21E are diagrams explaining shift patterns of the above-described shift lever.

FIG. 21A shows shift patterns of a case in which the current shift range starts shifting operation from the state of the parking range. As shown in this figure, the shift range is switched to the neutral range in the case in which the shift lever 10 is tilted forward or rearward from the home position in the state in which the current shift range is the parking range. Further, the shift range is switched to the drive range in the case in which the shift lever 10 is tilted rearward and subsequently the push button 40 is pressed, and the shift range is switched to the reverse range in the case in which the shift lever 10 is tilted forward and subsequently the push button 40 is pressed.

Meanwhile, in the case in which the shift lever 10 is tilted left or right from the home position in the state in which the current shift range is the parking range, the tilting is unavailable. That is, the current range (the parking range in this case) is maintained and also the massage to inform that the operations are unavailable is indicated on the specified indication portion at the meter unit 3, for example.

Figure 22:
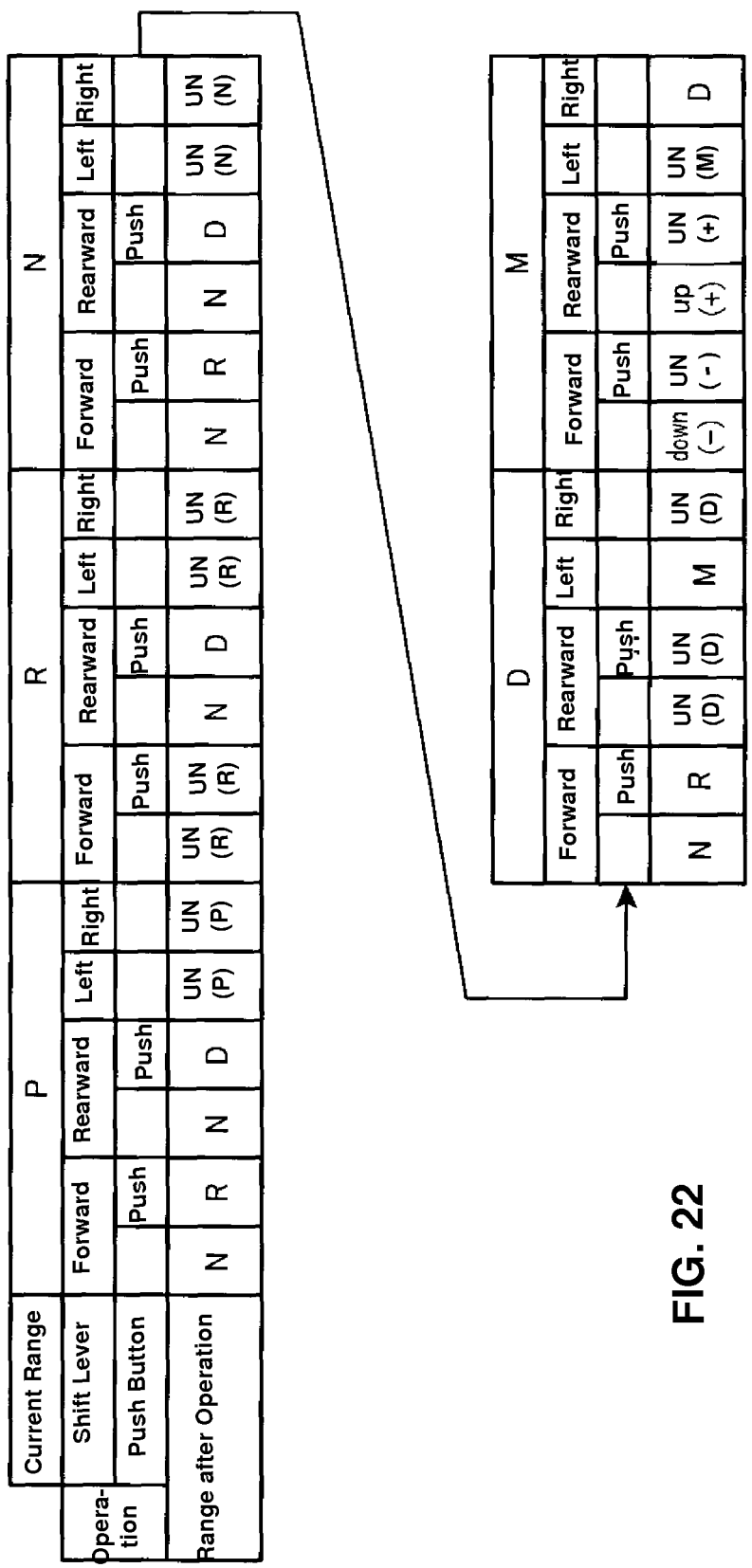
FIG. 22 is a chart of the shift patterns shown in FIGS. 21A-21E.

As described above, the shift patterns in the case of the current shift range being the parking range are as follows, as shown at the rows of "Current Range"="P" of the chart of FIG. 22.

Forward Lever Operation→Neutral Range
Forward Lever Operation & Button Push→Reverse Range
Rearward Lever Operation→Neutral Range
Rearward Lever Operation & Button Push→Drive Range
Left Lever Operation→Unavailable
Right Lever Operation→Unavailable (Shift Patterns from Reverse Range)

Figure 21B:
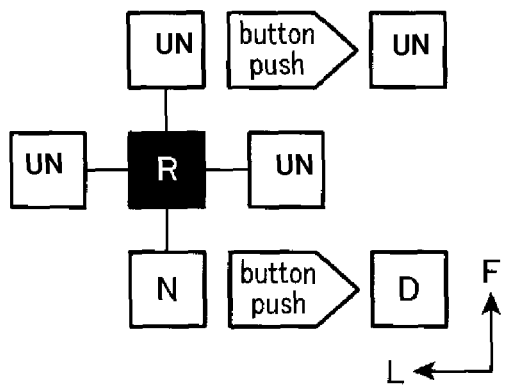

FIG. 21B shows shift patterns of a case in which the current shift range starts shifting operation from the state of the reverse range. As shown in this figure, even if the shift lever 10 is tilted forward from the home position in the state in which the current shift range is the reverse range and even if the push button 40 is further pressed from this forward-tilting state of the shift lever 10, these tilting or pressing operations are unavailable. Contrary, in the case in which the shift lever 10 is tilted rearward from the home position, the shift range is switched to the neutral range from the reverse range. Further, in the case in which the push button 40 is pressed additionally to the rearward tilting of the shift lever 10, the shift range is switched to the drive range. Meanwhile, when the shift lever 10 is tilted left or right from the home position, the tilting is unavailable.

As described above, the shift patterns in the case of the current shift range being the reverse range are as follows, as shown at the rows of "Current Range"="R" of the chart of FIG. 22.

Forward Lever Operation→Unavailable
Forward Lever Operation & Button Push→Unavailable
Rearward Lever Operation→Neutral Range
Rearward Lever Operation & Button Push→Drive Range
Left Lever Operation→Unavailable
Right Lever Operation→Unavailable (Shift Patterns from Neutral Range)

Figure 21C:
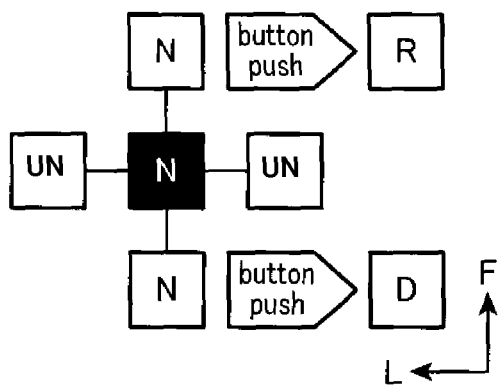

FIG. 21C shows shift patterns of a case in which the current shift range starts shifting operation from the state of the neutral range. As shown in this figure, even if the shift lever 10 is tilted forward or rearward from the home position in the state in which the current range is the neutral range, the shift range remains at the neural range, not change. In the case in which the push button 40 is pressed additionally to the rearward tilting of the shift lever 10, the shift range is switched to the drive range, and in the case in which the push button 40 is pressed additionally to the forward tilting of the shift lever 10, the shift range is switched to the reverse range. Further, in the case in which the shift lever 10 is tilted left or right from the home position, the tilting is unavailable.

As described above, the shift patterns in the case of the current shift range being the neutral range are as follows, as shown at the rows of "Current Range"="N" of the chart of FIG. 22.

Forward Lever Operation→Neutral Range (maintaining of the current status)
Forward Lever Operation & Button Push→Reverse Range
Rearward Lever Operation→Neutral Range (maintaining of the current status)
Rearward Lever Operation & Button Push→Drive Range
Left Lever Operation→Unavailable
Right Lever Operation→Unavailable (Shift Patterns from Drive Range)

Figure 21D:
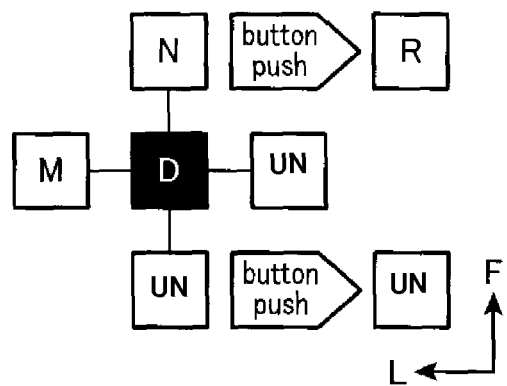

FIG. 21D shows shift patterns of a case in which the current shift range starts shifting operation from the state of the drive range. As shown in this figure, even if the shift lever 10 is tilted rearward from the home position in the state in which the current range is the drive range and even if the push button 40 is further pressed from this rearward-tilting state of the shift lever 10, these tilting or pressing operations are unavailable. Contrary, in the case in which the shift lever 10 is tilted forward, the shift range is switched to the neutral range from the drive range. Further, in the case in which the push button 40 is pressed additionally to the forward tilting of the shift lever 10, the shift range is switched to the reverse range.

In the case in which the shift lever 10 is tilted left from the home position, the shift range is switched to the neutral range from the drive range. Contrary, in the case in which the shift lever 10 is tilted right from the home position, the tilting is unavailable.

As described above, the shift patterns in the case of the current shift range being the drive range are as follows, as shown at the rows of "Current Range"="D" of the chart of FIG. 22.

Forward Lever Operation→Neutral Range
Forward Lever Operation & Button Push→Reverse Range
Rearward Lever Operation→Unavailable Rearward Lever Operation & Button Push→Unavailable
Left Lever Operation→Manual Range
Right Lever Operation→Unavailable (Shift Patterns from Manual Range)

Figure 21E:
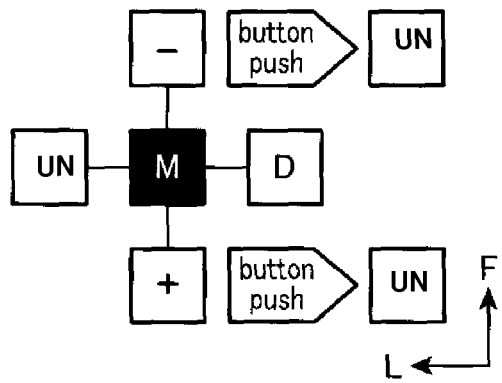

FIG. 21E shows shift patterns of a case in which the current shift range starts shifting operation from the state of the manual range. As shown in this figure, in a case in which the shift lever 10 is tilted rearward from the home position in a state in which the current shift range is the manual range, up-shift to shift up by one gear is executed. Contrary, in a case in which the shift lever 10 is tilted forward from the home position, down-shift to shift down by one gear is executed. Herein, in the case in which the push button 40 is pressed additionally to the forward or rearward tilting of the shift lever 10, the pressing operation of the push button 40 is unavailable (the lever operation is not unavailable, so that the up-shift or the down-shift are executed.).

In a case in which the shift lever 10 is tilted right from the home position, the shift range is switched to the drive range from the manual range. Contrary, in a case in which the shift lever 10 is tilted left from the home position, the tilting operation is unavailable.

As described above, the shift patterns in the case of the current shift range being the drive range are as follows, as shown at the rows of "Current Range"="M" of the chart of FIG. 22.

Forward Lever Operation→Down Shift
Forward Lever Operation & Button Push→Down Shift (Button Push Unavailable)
Rearward Lever Operation→Up Shift
Rearward Lever Operation & Button Push→Up Shift (Button Push Unavailable)
Left Lever Operation→Unavailable
Right Lever Operation→Drive Range Herein, in a case in which the push button 40 is pressed, keeping the shift lever 10 held at the home position, regardless of what the current shift range is, this pressing operation is unavailable (which is not illustrated).

Further, in a case in which the push button 40 is pressed additionally to the left or right tilting of the shift lever 10 from the home position, regardless of what the current shift range is, this pressing operation of the push button 40 is unavailable.

(Determinative Logics at Traveling-Range Switching)

In the case of switching to the drive range or the reverse range from the other range than the manual range (see FIGS. 21A-21D), determination as to whether this switching is executed or not is, similarly to the above-described first embodiment, conducted based on the amount of move (forward or rearward rotational angle) of the shift lever 10 detected by the longitudinal-move amount sensor 29 and the signal of the push button 40 (the signal generated at the button pressing). That is, the shift range is switched to the drive range when it is recognized by the controller 60 that the push button 40 is pressed further in a state in which the amount of move of the shift lever 10 tilted rearward from the home position exceeds the first threshold T1 (FIG. 11). The shift range is switched to the reverse range when it is recognized by the controller 60 that the push button 40 is pressed further in a state in which the amount of move of the shift lever 10 tilted forward from the home position exceeds the second threshold T2 (FIG. 11). Herein, the second threshold T2 used for switching to the reverse range is set to be greater than the first threshold T1 used for switching to the drive range.

According to the fourth embodiment described above, similarly to the first embodiment, the switching operation to the drive range or the reverse range can be conducted easily and quickly, and also the driver is urged to operate carefully at the time of switching to the reverse range, so that the safety and the like can be further improved.

Embodiment 5

While the shift lever 10 which can be tilted in the longitudinal two directions (or the longitudinal-and-lateral four directions) is applied as the "operational member" in the claims in the above-described first through fourth embodiments, any type of operational member can be used as long as it can be moved at least in any two directions. Another type of operational member will be described as a fifth embodiment.

Figure 23:
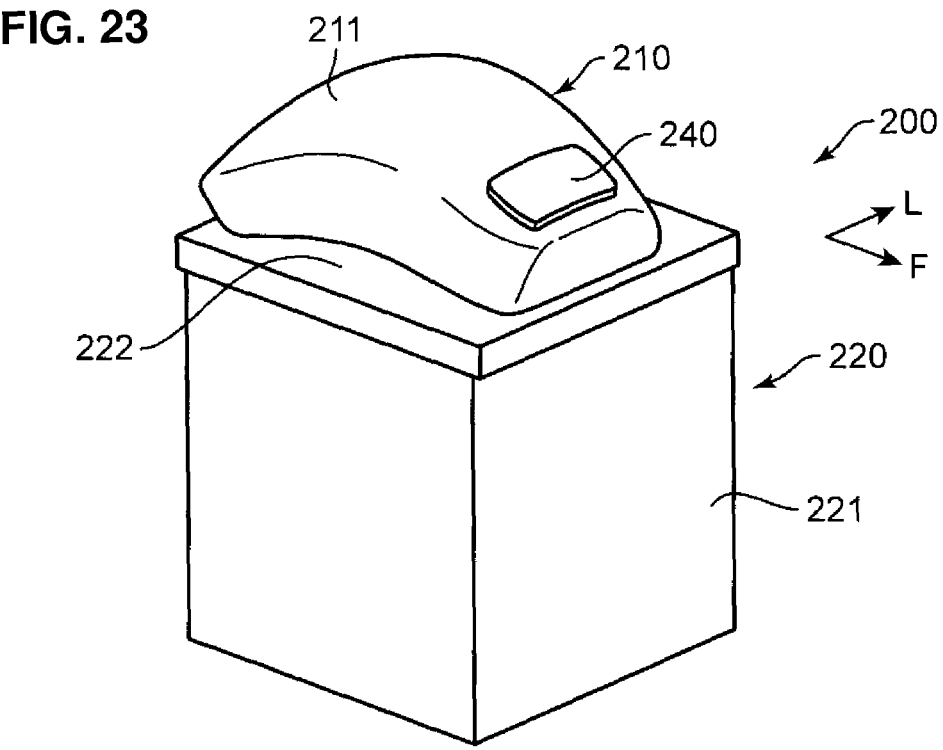
FIG. 23 is a perspective view of a shift device according to a fifth embodiment of the present invention.
Figure 24:
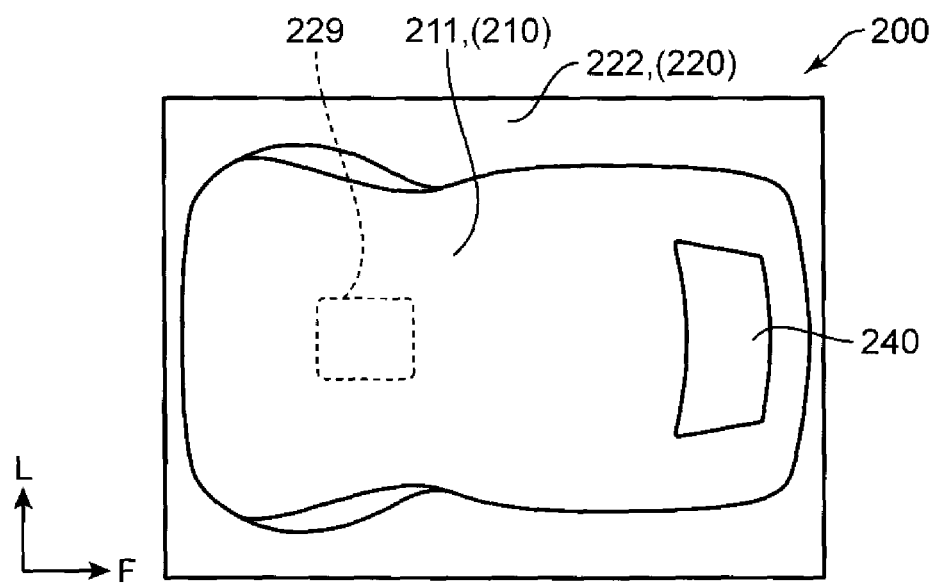
FIG. 24 is a plan view of the above-described shift device.
Figure 25:
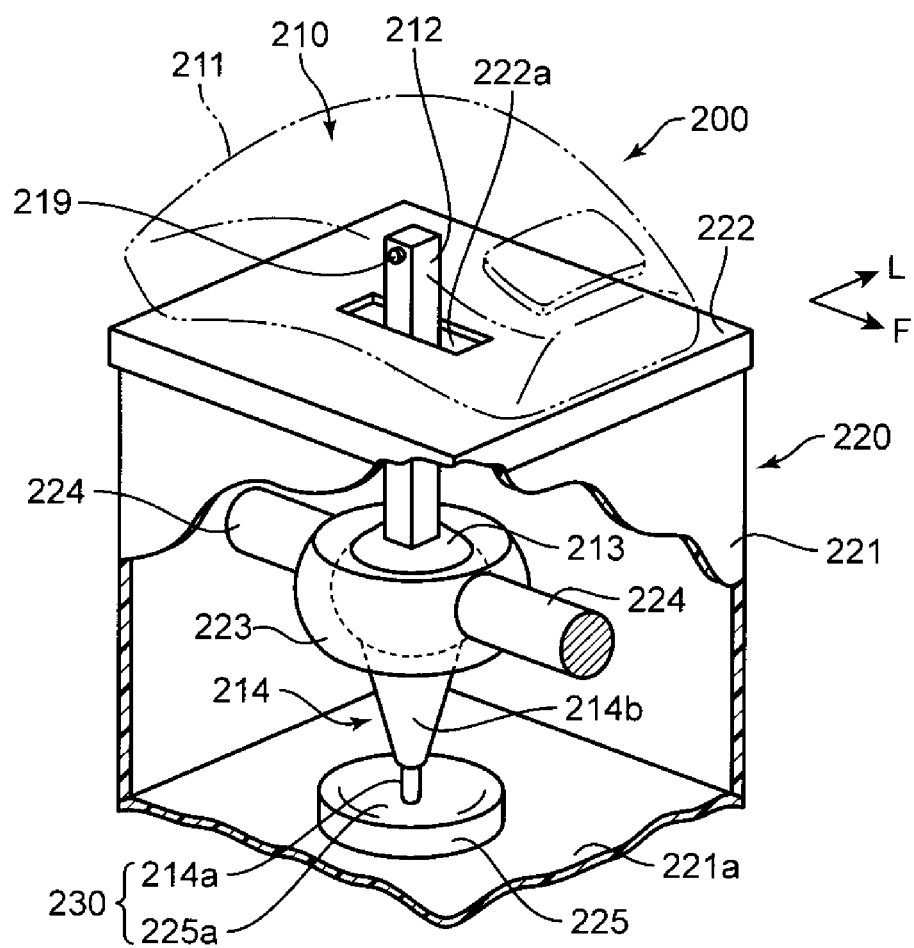
FIG. 25 is a perspective view of the above-described shift device, a part of which is cut off.

A shift device 200 of the fifth embodiment comprises, as shown in FIGS. 23-25, a slide operational member 210 and a body portion 220 which supports the slide operational member 210 so that the member 210 can slide longitudinally.

The slide operational member 210, which corresponds to the "operational member" in the claims, comprises a grip portion 211 which has a shape similar to a mouse (pointer) used in a PC (personal computer), a lever portion 212 which is formed in a square-pillar shape and pivoted at the grip portion 211 via a support axis 219 at its upper end portion, a sphere portion 213, and a leg portion for detent 214 which extends downward from the sphere body 213, as specifically shown in FIG. 25.

A push button 240 which is comprised of a push type of button switch is provided at an upper face of a front portion of the grip portion 211.

The leg portion for detent 214 comprises a leg body 214*b* and a biasing portion 214*a* which projects from a tip of the leg body 214, being pressed downward by a compressive spring (not illustrated).

The body portion 220 comprises a boxy housing 221 and a cover portion 222 which is attached so as to cover an opening of the upper face of the housing 221. A slit 222*a*, into which the lever portion 212 of the slide operational member 210 is inserted so as to slide, is formed at the cover portion 222.

A support portion 223 which supports a sphere portion 213 of the slide operational member 210 in a wrapping manner is attached inside the housing 221 through a pair of longitudinal connection portions 224. Further, a guide member 225 with a sphere-shaped receipt face 225*a* which is concaved is provided at an upper face of a lower wall 221*a* of the housing 221. A biasing portion 214*a* of the leg portion for detent 214 is pressed against the sphere-shaped receipt face 225*a* of the guide member 225. Thereby, a detent mechanism 230 which automatically returns the slide operational member 210 to a specified home position (a state shown in FIG. 25) is constituted.

The above-described slide operational member 210 supported at the body portion 220 moves, receiving an operational force applied to the grip portion 211 from the driver. Herein, a moving direction of the slide operational member 210 is restricted to an extensional direction of the slit 222*a* formed at the cover portion 222, i.e., to a longitudinal direction.

As the grip portion 211 slides longitudinally over the upper face of the cover portion 222, receiving the operational force from the driver, the lever portion 212 moves such that the support axis 219 is tilted longitudinally around the support axis 219, and slides longitudinally inside the slit 222*a*. That is, the slide operational member 210 can move longitudinally only within a range from a position where the lever portion 212 contacts a front edge of the slit 222*a* to another position where the lever portion 212 contacts a rear edge of the slit 222*a*.

When the operational force for the grip portion 211 is released after the above-described moving operation of the slide operational member 210, the slide operational portion 211 is automatically returned to the home position, i.e., to a state shown in FIG. 25 in which the lever portion 212 is located at the center of the slit 222a and the biasing portion 214a is located at the central portion of the sphere-shaped receipt face 225a.

A move amount sensor 229 (FIG. 24) which detects the amount of longitudinal move of the grip portion 211 is provided at a back face of the grip portion 211. This move amount sensor 229, which is the same as a sensor used at an optical type of mouse for PC, comprises a light source which irradiates light onto an upper face of the cover portion 222, such as LED, and an optical sensor which has an image element to capture an image on an irradiation face of the light source.

The shift device 200 of the fifth embodiment comprises a controller (not illustrated) which is similar to the controller 60 of the first embodiment. This controller receives a detection signal of the move amount sensor 229 and a signal of an electric contact stored at the push button 240, and controls shift ranges of the automatic transmission based on these signals. Herein, the shift patterns similar to the first embodiment (FIGS. 9 and 10) are applied.

For example, in order to switch to the drive range from any one of the parking range, the reverse range, and the neutral range, the grip portion 211 of the slide operational member 210 is slid rearward and then the push button 240 is pressed (FIGS. 9A, 9B and 9C). Further, in order to switch to the reverse range from any one of the parking range, the neutral range, and the drive range, the grip portion 211 of the slide operational member 210 is slid forward and then the push button 240 is pressed (FIGS. 9A, 9C and 9D).

It is necessary that the mount of longitudinal move of the grip portion 211 of the slide operational member 210 exceeds a specified threshold in order to accept a pressing operation of the push button 240 at the time of switching to the drive range or the reverse range. The manner of setting the threshold in the fifth embodiment is similar to the first embodiment. That is, the first threshold T1 for switching to the drive range is set to be greater than the second threshold T2 for switching to the reverse range (see FIG. 11).

According to the fifth embodiment described above, similarly to the first embodiment, the switching operation to the drive range or the reverse range can be conducted easily and quickly, and also the driver is urged to operate carefully at the time of switching to the reverse range, so that the safety and the like can be further improved.

Other Modifications

While the shift lever 10 (corresponding to the "operational member" in the claims) is configured to be tilted in the longitudinal two directions or the longitudinal-and-lateral four directions in the first through fourth embodiments, it may be configured to be tilted in three directions, i.e., forward, rearward, and left or right, for example. In this case, shift patterns where the shift range is switched to the manual range when the shift range 10 is tilted left or right in a state in which the drive range is selected, and then the shift range is switched to the drive range when the shift range 10 is tilted again in the above-described direction (i.e., left or right) from this state can be applied. Herein, since it is just required that the shift lever 10 is configured to be moved in the two or more directions, the additional number of moving directions of the shift lever 10 more than two or the specific directions (longitudinal, lateral and oblique directions) can be properly designed in accordance with required functions, regulations or the like. This is similar to the fifth embodiment which uses the slide operational member 210 as the operational member.

Further, while the third embodiment is configured such that the first and second projections 81, 82 are provided on the sphere-shaped receipt face 25a constituting the detent mechanism 30 and also the members temporally increasing the resistant force for the shift lever 10 (corresponding to the "first and second resistance-applying members" in the claims) are constituted by the first and second projections 81, 82, any modification of the resistance-applying member can be applied as long as it can temporally increase the resistant force for the shift lever 10 (the operational member). For example, projections may be provided at an inner wall of the guide groove (27, 97), along which the leg portion for guide 15 of the shift lever 10 slides, so that the width of the groove can be narrowed partially by this projection. Consequently, the resistant force for the shift lever 10 can be increased.

Also, while the shift patterns shown in FIGS. 21A-21E are applied for the vehicle with a steering wheel arranged on the left side in the fourth embodiment, it is preferable for a vehicle with the steering wheel arranged on the right side that the shift patterns be changed in a laterally-symmetrical manner, that is—such that the position of the manual range (M) of FIG. 21D and the position of the drive range (D) of FIG. 22E are reverse laterally.

Moreover, while the push type of button switch (the push button 40 or 240) is applied as the "switch portion" in the claims according to the above-described embodiments, any other type of switch, such as a toggle switch, can be applied. Moreover, a pressure-sensitive sensor which detects existence of switch operation based on the magnitude of the pressure inputted from a driver's finger may be used as the "switch portion."

Further, while the shift device of the above-described embodiments is configured to switch the shift ranges of the multi-stage type of automatic transmission 50 arranged between the engine (internal combustion engine) and the wheels, the applicable transmission of the present invention is not limited to this multi-stage type of automatic transmission, but a non-stage transmission (CVT) may be used, for example. Further, the present invention is applicable to a type of transmission used for the electrical vehicle in which forward/rearward traveling of the vehicle is electrically switched.

What is claimed is:
1. A shift device for a vehicle, comprising:
an operational member;
a switch portion provided at the operational member;
a body portion supporting the operational member such that the operational member is moved at least in two directions of a first direction and a second direction and automatically returned to a specified home position after the operational member has been moved; and
a controller detecting operations of the operational member and the switch portion and controlling a shift range based on information of the detected operations,
wherein said controller is configured such that a neutral range is selected when said operational member is operationally moved in any direction of the first and second directions from the home position in a state in which a non-travelling range is selected as the shift range, and the shift range is switched to a drive range for forward traveling or a reverse range for backward traveling when said switch portion is operated in addition to the operation of the operational member, said switching to the drive range is executed when the switch portion is operated in a state in which the amount of move of the operational member operationally moved in the first direction from the home position exceeds a first threshold, and said switching to the reverse range is executed when the switch portion is operated in a state in which the amount of move of the operational member operationally moved in the second direction from the home position exceeds a second threshold, said second threshold for switching to the reverse range being set to be greater than said first threshold for switching to the drive range such that an amount of move of the operational member which is necessary for switching to the reverse range is larger than that of move of the operational member which is necessary for switching to the drive range.

2. The shift device for a vehicle of claim 1, wherein said first and second directions are arranged on the same straight line but extend in opposite directions to each other.

3. The shift device for a vehicle of claim 2, wherein said straight line extends in a vehicle longitudinal direction.

4. The shift device for a vehicle of claim 3, wherein said body portion comprises a first resistance-applying member to temporarily increase a resistant force for the operational member right before the amount of move of the operational member operationally moved in the first direction has exceeded the first threshold, and a second resistance-applying member to temporarily increase another resistant force for the operational member right before the amount of move of the operational member operationally moved in the second direction has exceeded the second threshold.

5. The shift device for a vehicle of claim 4, further comprising an informing device to provide specified information to a driver of the vehicle, respectively, when the amount of move of the operational member operationally moved in the first direction from the home position for the switching to the drive range exceeds said first threshold and when the amount of move of the operational member operationally moved in the second direction from the home position for the switching to the reverse range exceeds said second threshold.

6. A shift device for a vehicle, comprising:
an operational member;
a switch portion provided at the operational member;
a body portion supporting the operational member such that the operational member is moved at least in two directions of a first direction and a second direction and automatically returned to a specified home position after the operational member has been moved;
a controller detecting operations of the operational member and the switch portion and controlling a shift range based on information of the detected operations; and
an informing device,
wherein said controller is configured such that a neutral range is selected when said operational member is operationally moved in any direction of the first and second directions from the home position in a state in which a non-travelling range is selected as the shift range, and the shift range is switched to a drive range for forward traveling or a reverse range for backward traveling when said switch portion is operated in addition to the operation of the operational member,
said switching to the drive range is executed when the switch portion is operated in a state in which the amount of move of the operational member operationally moved in the first direction from the home position exceeds a first threshold, said switching to the reverse range is executed when the switch portion is operated in a state in which the amount of move of the operational member operationally moved in the second direction from the home position exceeds a second threshold which is greater than the first threshold, and said informing device is configured to provide specified information to a driver of the vehicle, respectively, when the amount of move of the operational member operationally moved in the first direction from the home position for the switching to the drive range exceeds said first threshold and when the amount of move of the operational member operationally moved in the second direction from the home position for the switching to the reverse range exceeds said second threshold.

7. A shift device for a vehicle, comprising:
an operational member;
a switch portion provided at the operational member;
a body portion supporting the operational member such that the operational member is moved at least in two directions of a first direction and a second direction and automatically returned to a specified home position after the operational member has been moved; and
a controller detecting operations of the operational member and the switch portion and controlling a shift range based on information of the detected operations,
wherein said controller is configured such that a neutral range is selected when said operational member is operationally moved in any direction of the first and second directions from the home position in a state in which a non-travelling range is selected as the shift range, and the shift range is switched to a drive range for forward traveling or a reverse range for backward traveling when said switch portion is operated in addition to the operation of the operational member,
said switching to the drive range is executed when the switch portion is operated in a state in which the amount of move of the operational member operationally moved in the first direction from the home position exceeds a first threshold,
said switching to the reverse range is executed when the switch portion is operated in a state in which the amount of move of the operational member operationally moved in the second direction from the home position exceeds a second threshold,
said second threshold for switching to the reverse range being set to be greater than said first threshold for switching to the drive range such that an amount of move of the operational member which is necessary for switching to the reverse range is larger than that of move of the operational member which is necessary for switching to the drive range, and
said body portion comprises a first resistance-applying member to temporarily increase a resistant force for the operational member right before the amount of move of the operational member operationally moved in the first direction has exceeded the first threshold, and a second resistance-applying member to temporarily increase another resistant force for the operational member right before the amount of move of the operational member operationally moved in the second direction has exceeded the second threshold.

8. The shift device for a vehicle of claim 1, further comprising:
a move amount sensor configured to detect the amount of move of said operational member operationally moved in the first or second directions from the home position and supply a sensor output which corresponds to a magnitude of the detected move amount of the operational member, wherein said controller is configured to compare the sensor output of said move amount sensor with a first sensor output which corresponds to said first threshold of the move mount of the operational member operationally moved in the first direction or a second sensor output which corresponds to said second threshold of the move amount of the operational member operationally moved in the second direction, and said state in which the amount of move of the operational member operationally moved in the first or second directions from the home position exceeds the first or second thresholds is determined based on a result of said comparison by the controller, a difference in value between said second sensor output and a neutral sensor output supplied by said move amount sensor when the operational member is located at the home position being set to be larger than a difference in value between said first sensor output and said neutral sensor output.

* * * * *